United States Patent
Wan et al.

(10) Patent No.: US 9,832,357 B2
(45) Date of Patent: Nov. 28, 2017

(54) TIME-OF-FLIGHT CAMERA SYSTEM WITH SCANNING ILUMINATOR

(71) Applicant: Google Inc., Mountain View, CA (US)

(72) Inventors: Chung Chun Wan, Fremont, CA (US); Jamyuen Ko, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/614,504

(22) Filed: Jun. 5, 2017

(65) Prior Publication Data

US 2017/0272632 A1    Sep. 21, 2017

Related U.S. Application Data

(63) Continuation of application No. 14/579,158, filed on Dec. 22, 2014, now Pat. No. 9,674,415.

(51) Int. Cl.

| | |
|---|---|
| H04N 5/222 | (2006.01) |
| H04N 5/225 | (2006.01) |
| H04N 5/232 | (2006.01) |
| H04N 13/02 | (2006.01) |
| G01S 17/02 | (2006.01) |
| G01S 17/42 | (2006.01) |
| H04N 5/235 | (2006.01) |
| G01S 7/481 | (2006.01) |
| G01S 7/497 | (2006.01) |

(Continued)

(52) U.S. Cl.
CPC .......... *H04N 5/2256* (2013.01); *G01B 11/24* (2013.01); *G01S 7/4813* (2013.01); *G01S 7/4815* (2013.01); *G01S 7/4817* (2013.01); *G01S 7/497* (2013.01); *G01S 17/023* (2013.01); *G01S 17/42* (2013.01); *G01S 17/89* (2013.01); *H04N 5/2354* (2013.01); *H04N 5/23219* (2013.01); *H04N 13/0271* (2013.01)

(58) Field of Classification Search
None
See application file for complete search history.

(56) References Cited

U.S. PATENT DOCUMENTS

| | | |
|---|---|---|
| H1742 H | 8/1998 | Richmond |
| 6,671,227 B2 | 12/2003 | Gilbert et al. |

(Continued)

FOREIGN PATENT DOCUMENTS

| | | |
|---|---|---|
| KR | 10-2011-0064622 | 6/2011 |
| WO | WO-2012107574 | 8/2012 |

OTHER PUBLICATIONS

Schwartz, JT , "Variable Intensity Programmable Illumination Sensor", *An IP.com Prior Art Database Technical Disclosure*, "IBM", TDB10-83, IPCOM000047285D, (Feb. 7, 2005), 2577-2580.

(Continued)

*Primary Examiner* — Stephen Coleman
(74) *Attorney, Agent, or Firm* — Fish & Richardson P.C.

(57) ABSTRACT

A time of flight camera system is described. The time of flight camera system includes an illuminator. The illuminator has a movable optical component to scan light within the time-of-flight camera's field of view to illuminate a first region within the field of view that is larger than a second region within the time-of-flight camera's field of view that is illuminated at any instant by the light. The illuminator also includes an image sensor to determine depth profile information within the first region using time-of-flight measurement techniques.

14 Claims, 26 Drawing Sheets

(51) Int. Cl.
*G01B 11/24* (2006.01)
*G01S 17/89* (2006.01)

(56) References Cited

U.S. PATENT DOCUMENTS

| | | |
|---|---|---|
| 7,544,945 B2 | 6/2009 | Tan et al. |
| 7,635,334 B2 | 12/2009 | Phelps |
| 7,936,038 B2 | 5/2011 | Jeong |
| 7,990,636 B2 | 8/2011 | Park et al. |
| 8,027,107 B2 | 9/2011 | Hwang et al. |
| 8,072,581 B1 | 12/2011 | Breiholz |
| 8,116,018 B2 | 2/2012 | Park et al. |
| 8,159,762 B2 | 4/2012 | Lim et al. |
| 8,218,016 B2 | 7/2012 | Park et al. |
| 8,717,546 B2 | 5/2014 | DeCoi et al. |
| 8,761,594 B1 | 6/2014 | Gross et al. |
| 8,803,967 B2 | 8/2014 | Oggier et al. |
| 2011/0194007 A1 | 8/2011 | Kim et al. |
| 2011/0211056 A1 | 9/2011 | Publicover et al. |
| 2012/0076361 A1 | 3/2012 | Fujiyoshi |
| 2012/0147147 A1 | 6/2012 | Park et al. |
| 2012/0289832 A1 | 11/2012 | Zhang et al. |
| 2013/0026859 A1 | 1/2013 | Bae et al. |
| 2013/0131836 A1 | 5/2013 | Latz et al. |
| 2013/0134470 A1 | 5/2013 | Shin |
| 2013/0163627 A1 | 6/2013 | Seurin et al. |
| 2013/0188022 A1 | 7/2013 | Katz et al. |
| 2013/0201292 A1 | 8/2013 | Walter et al. |
| 2013/0234029 A1 | 9/2013 | Bikumandla |
| 2014/0049766 A1 | 2/2014 | Hudman |
| 2014/0055771 A1 | 2/2014 | Oggier |
| 2014/0152813 A1 | 6/2014 | Wilks et al. |
| 2014/0211193 A1 | 7/2014 | Bloom et al. |
| 2014/0253688 A1 | 9/2014 | Metz et al. |
| 2015/0062558 A1* | 3/2015 | Koppal ............... G01S 17/89 356/5.01 |
| 2015/0185859 A1 | 7/2015 | Yamamoto |
| 2015/0378023 A1 | 12/2015 | Royo Royo et al. |
| 2016/0061586 A1 | 3/2016 | Broga et al. |

OTHER PUBLICATIONS

PCT/US2015/061416—International Search Report and Written Opinion, dated Feb. 26, 2016, 11 pages.

* cited by examiner

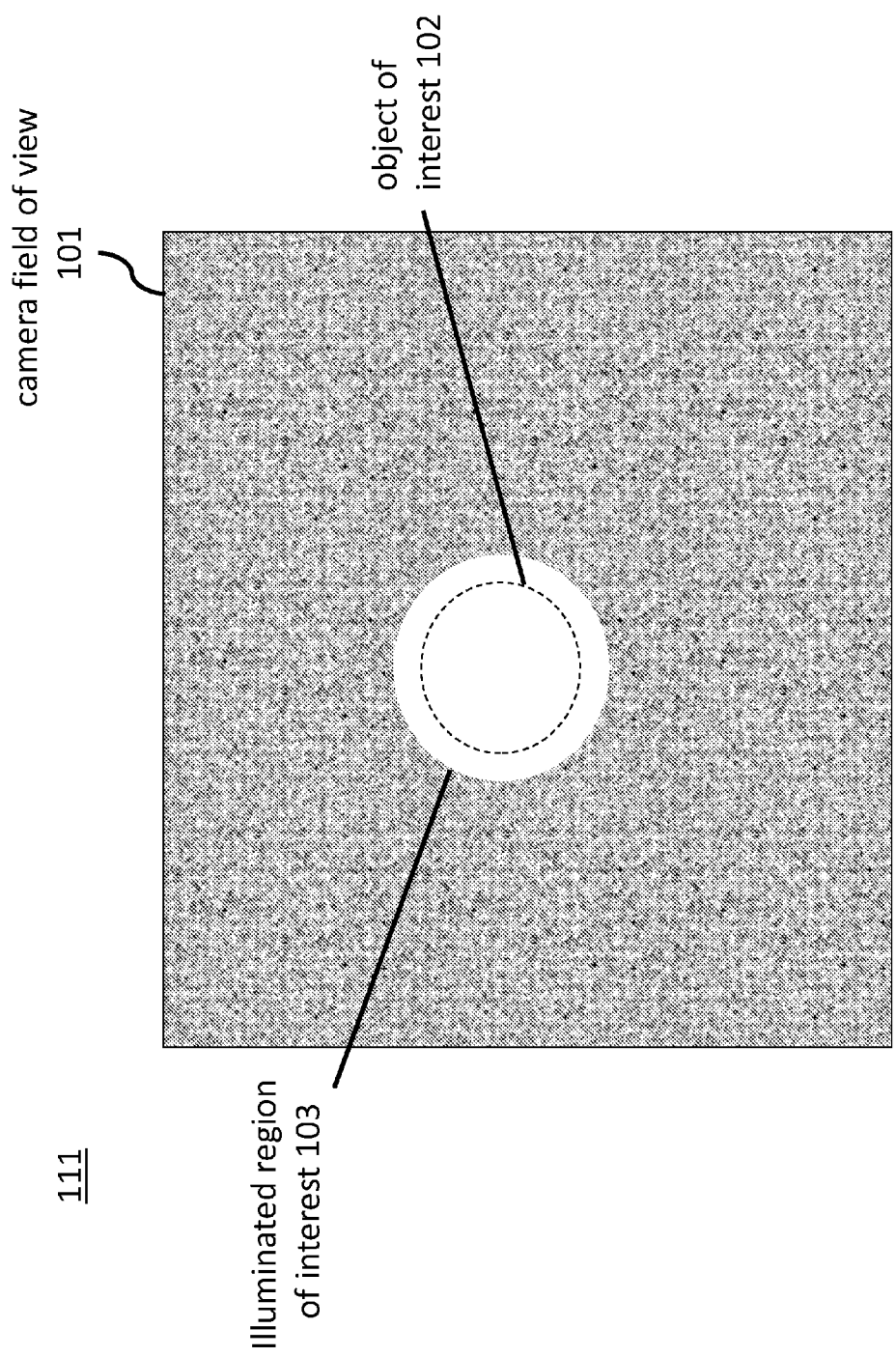

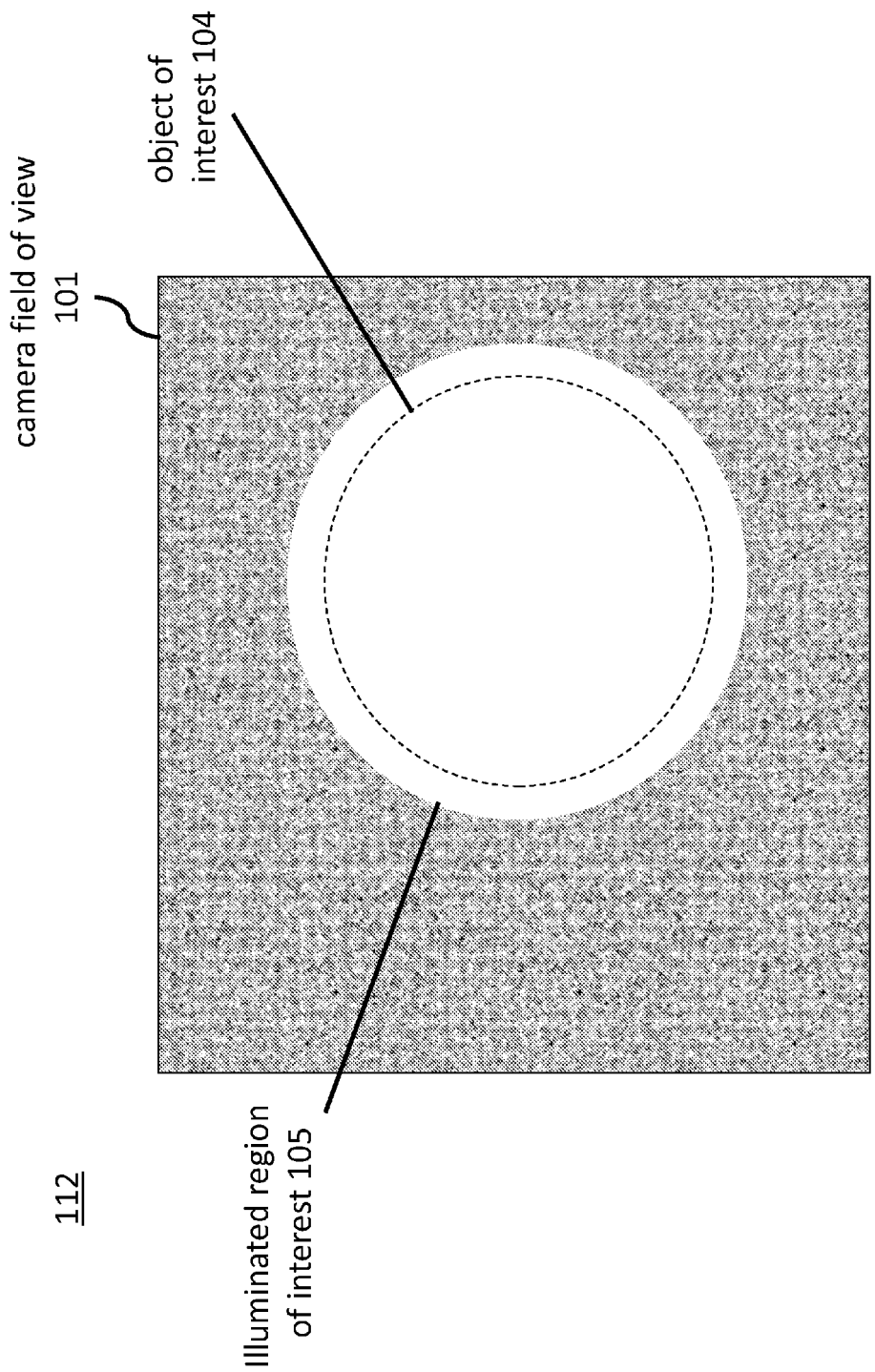
Fig. 1a(ii)

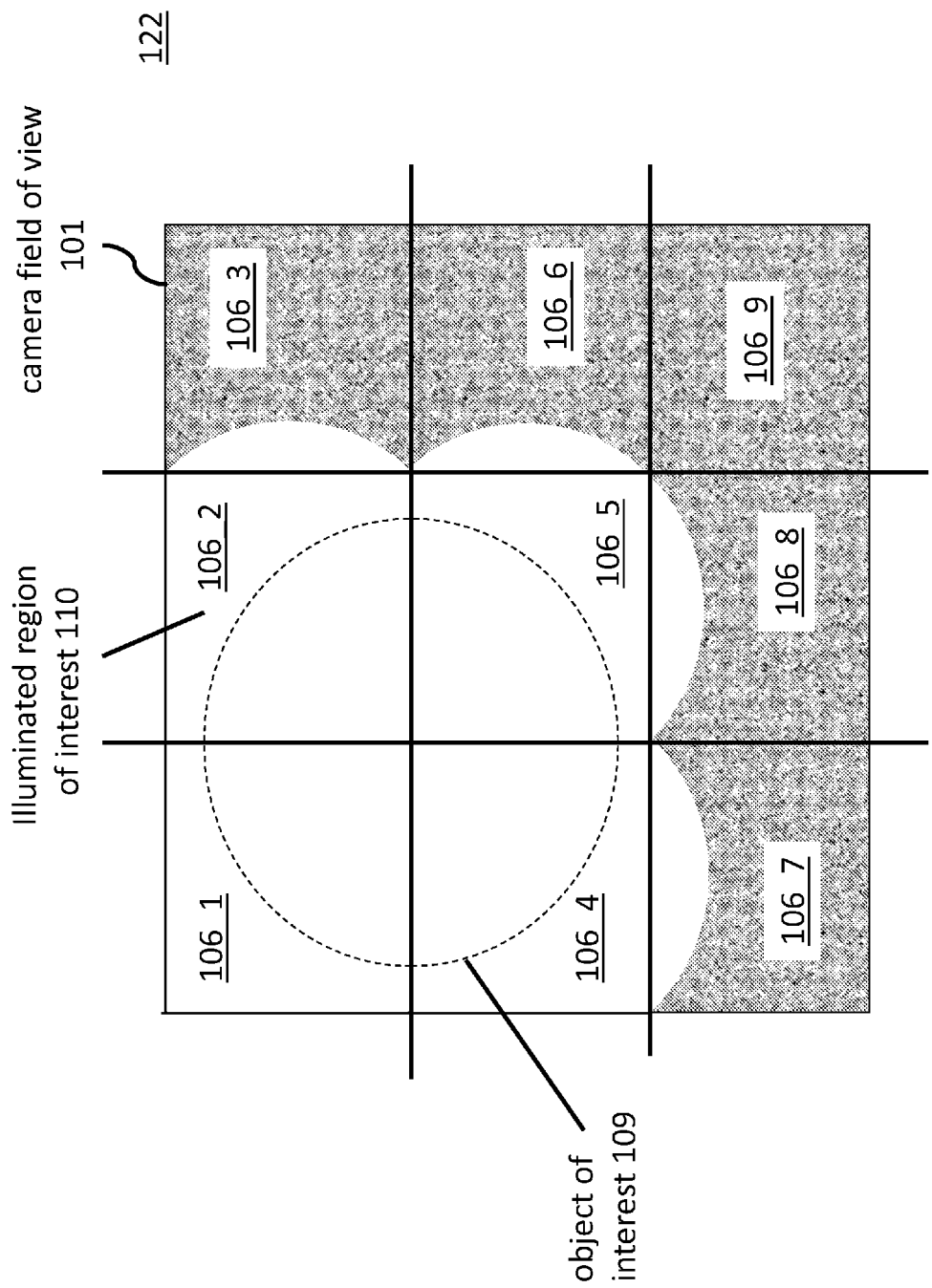

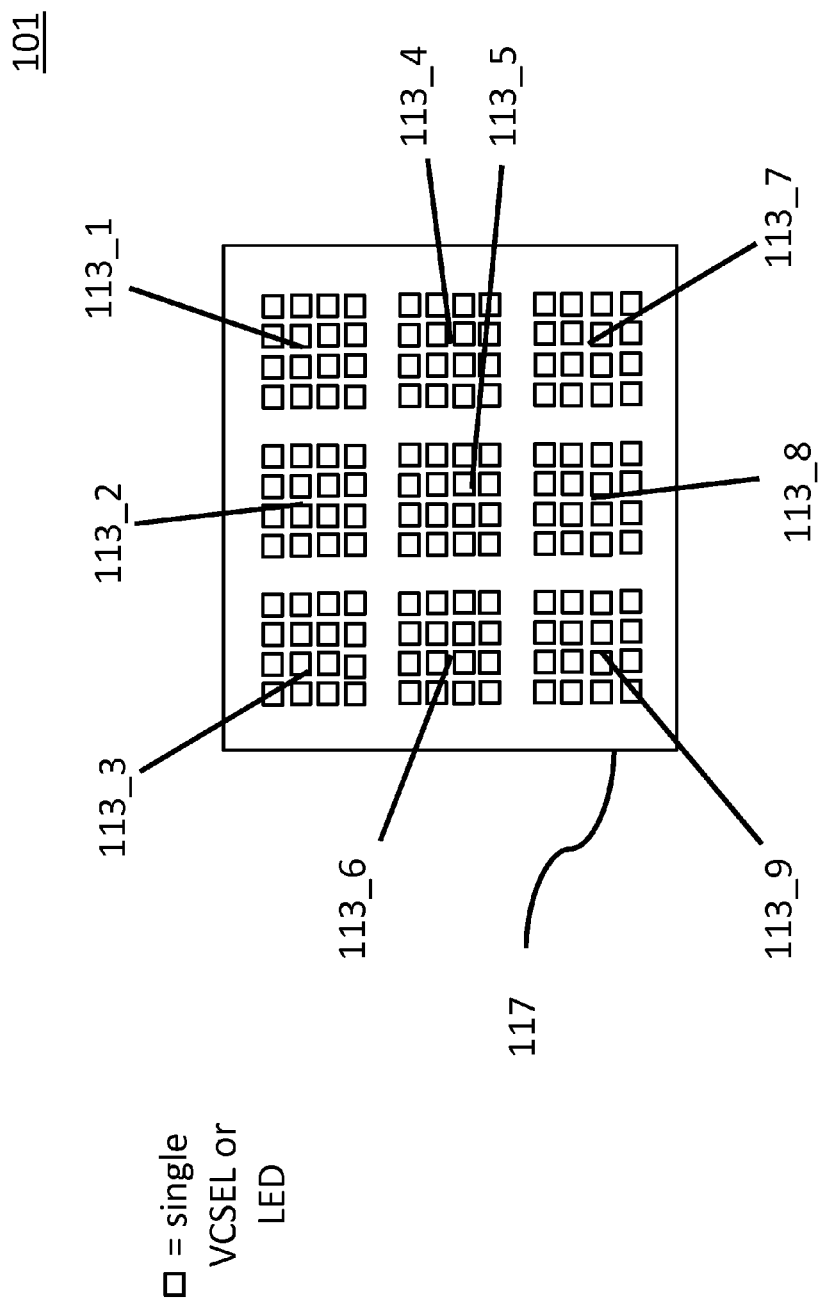

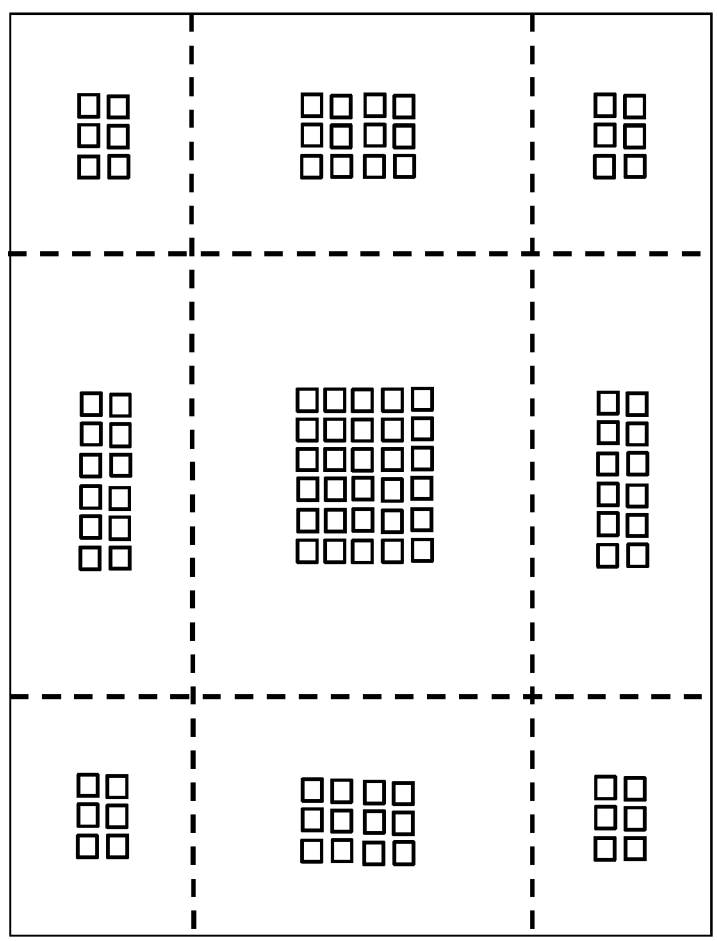
Fig. 1c(ii)

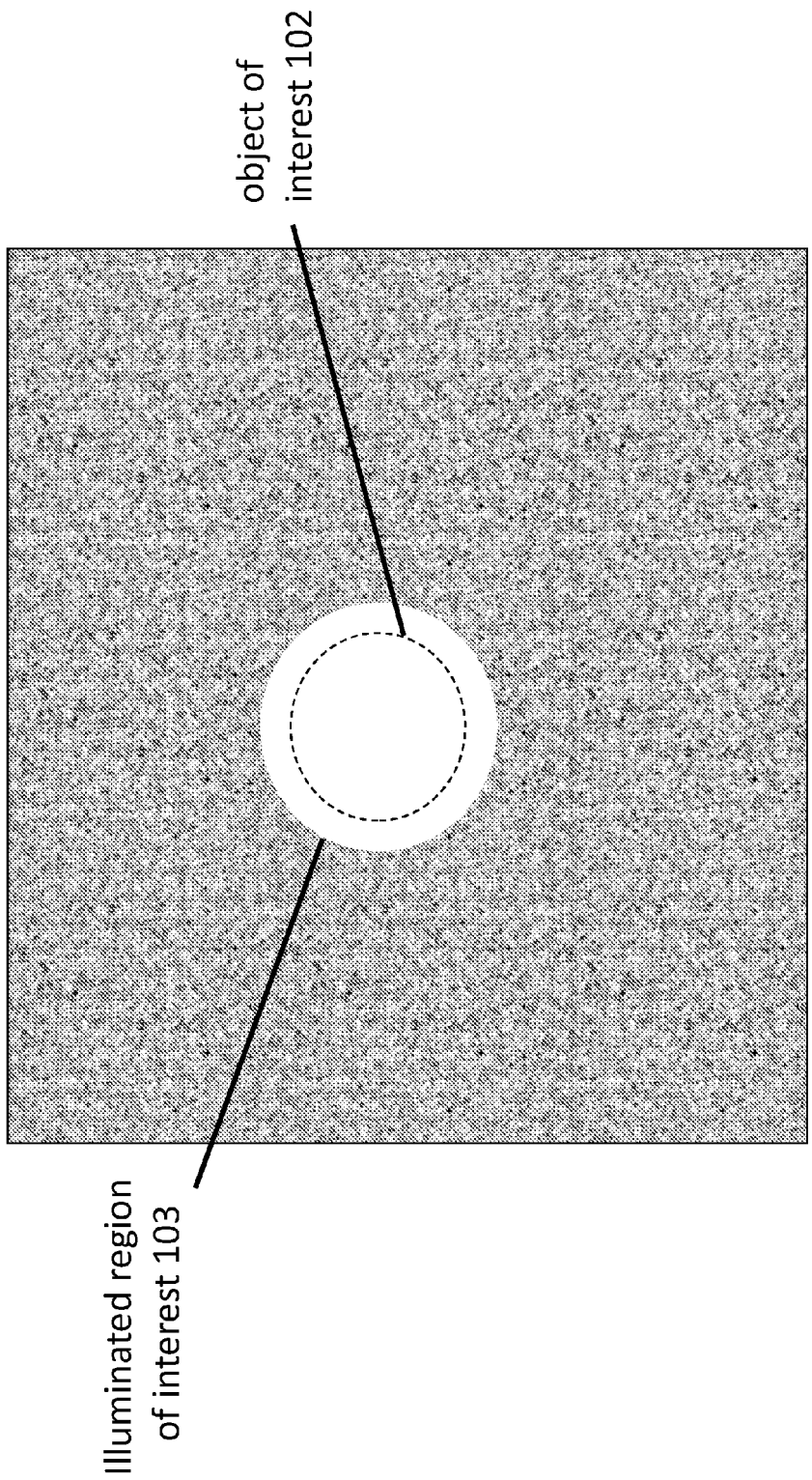

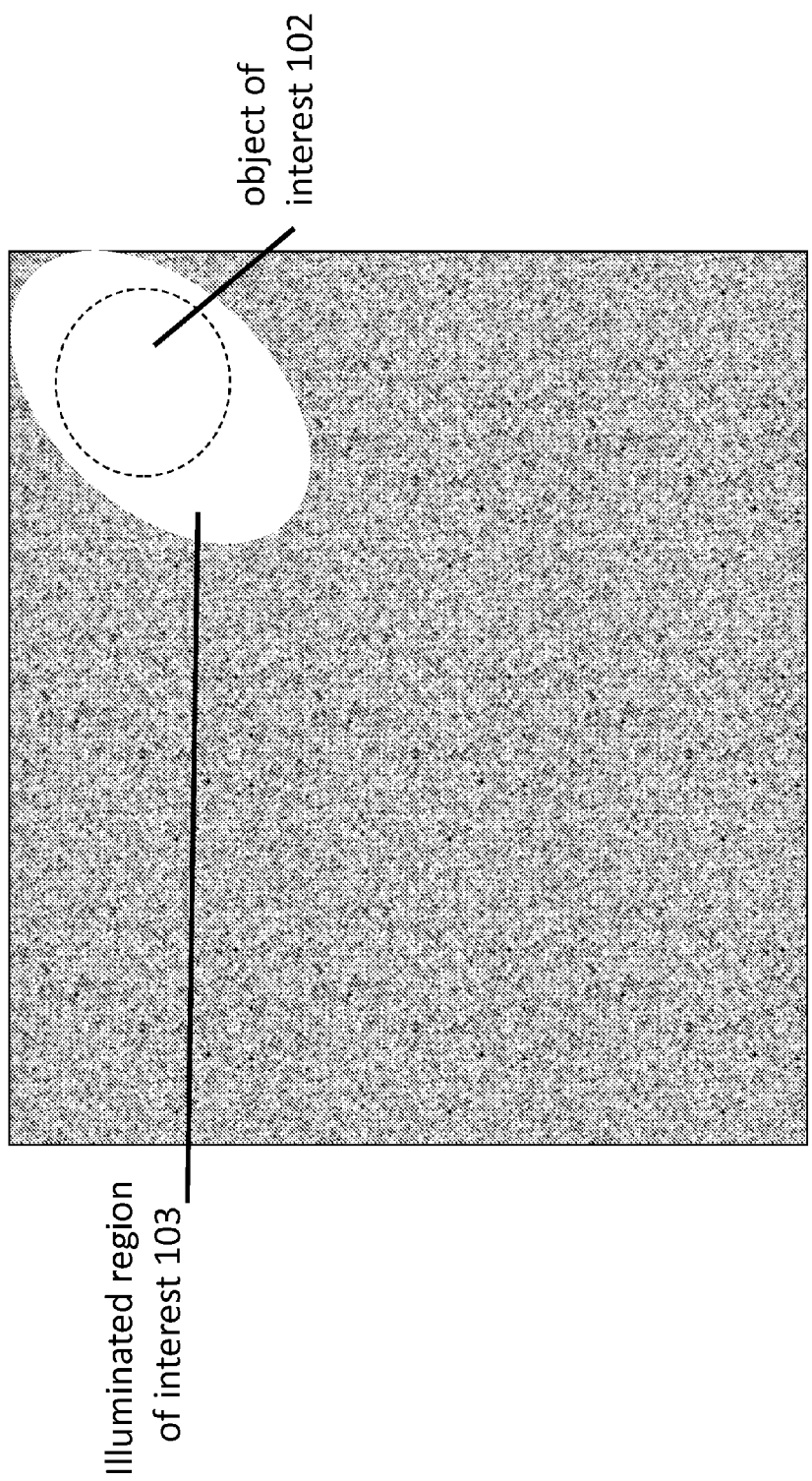
Fig. 1d(ii)

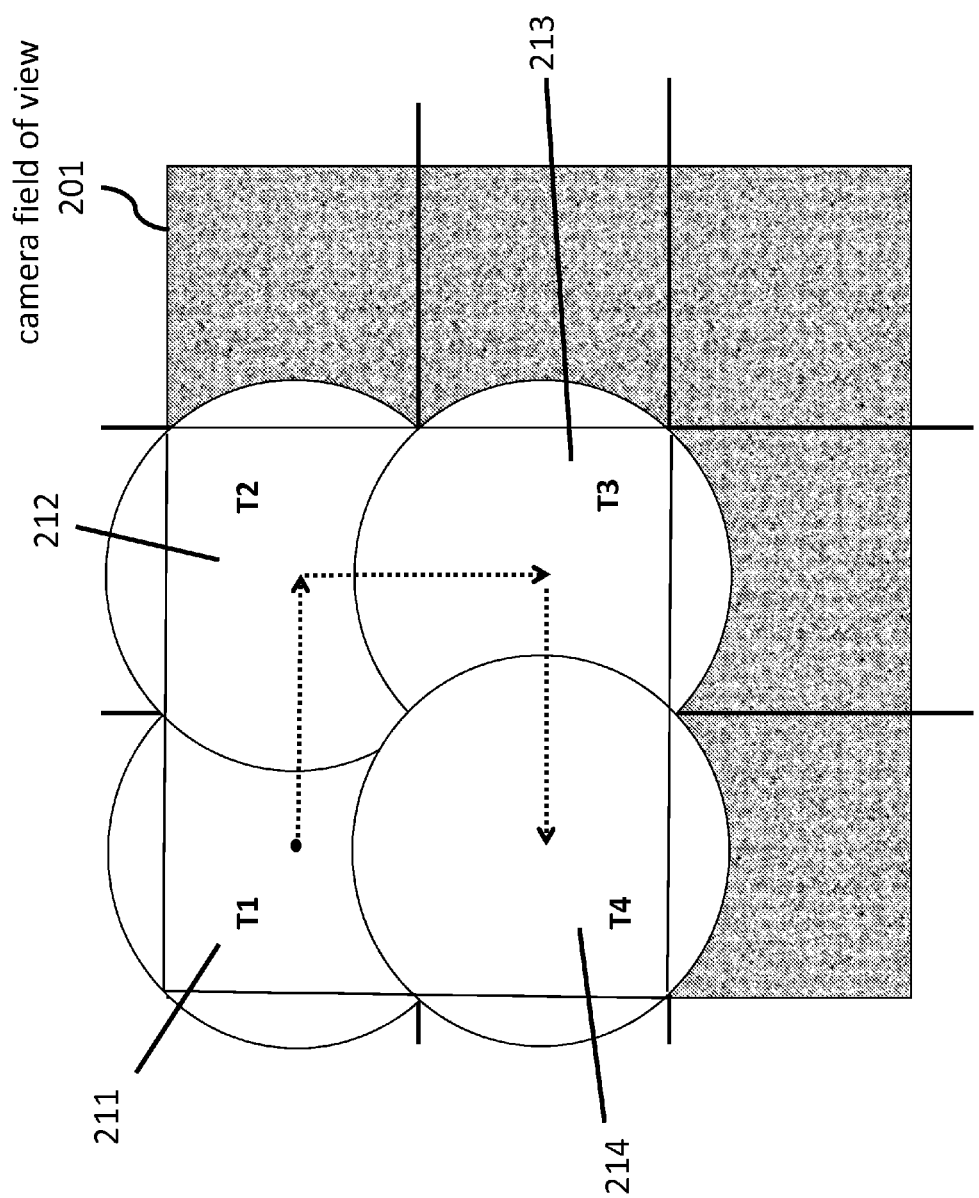

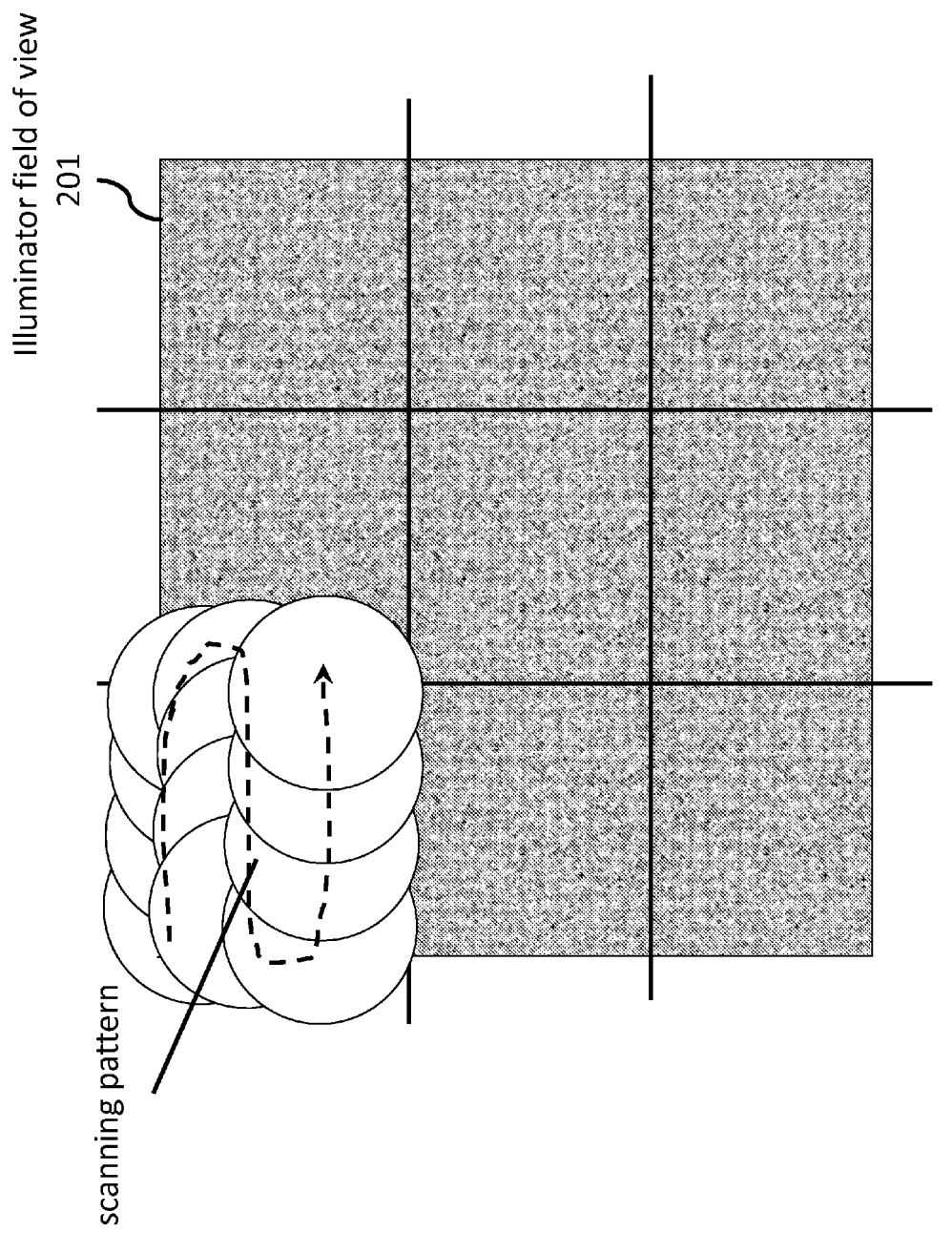

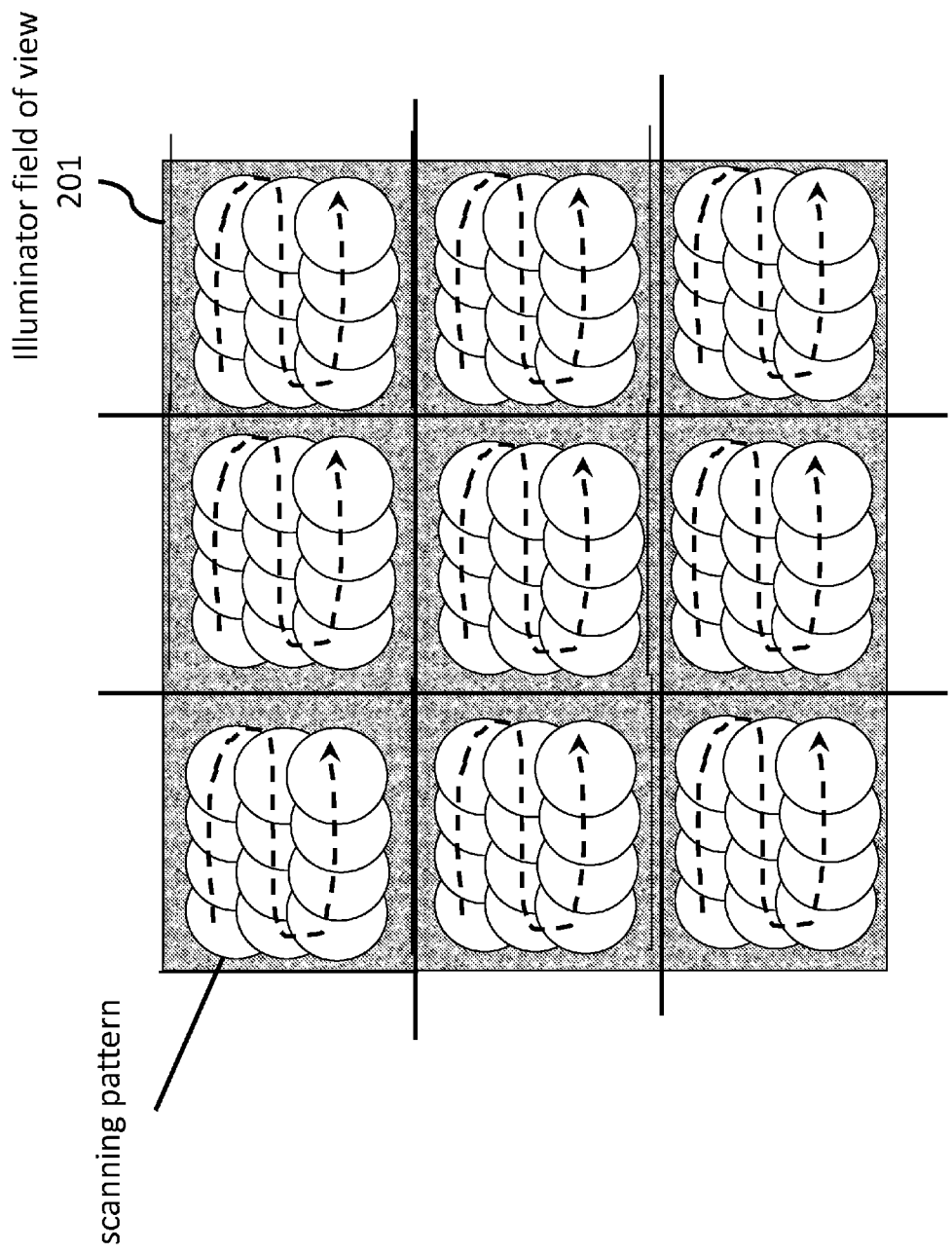

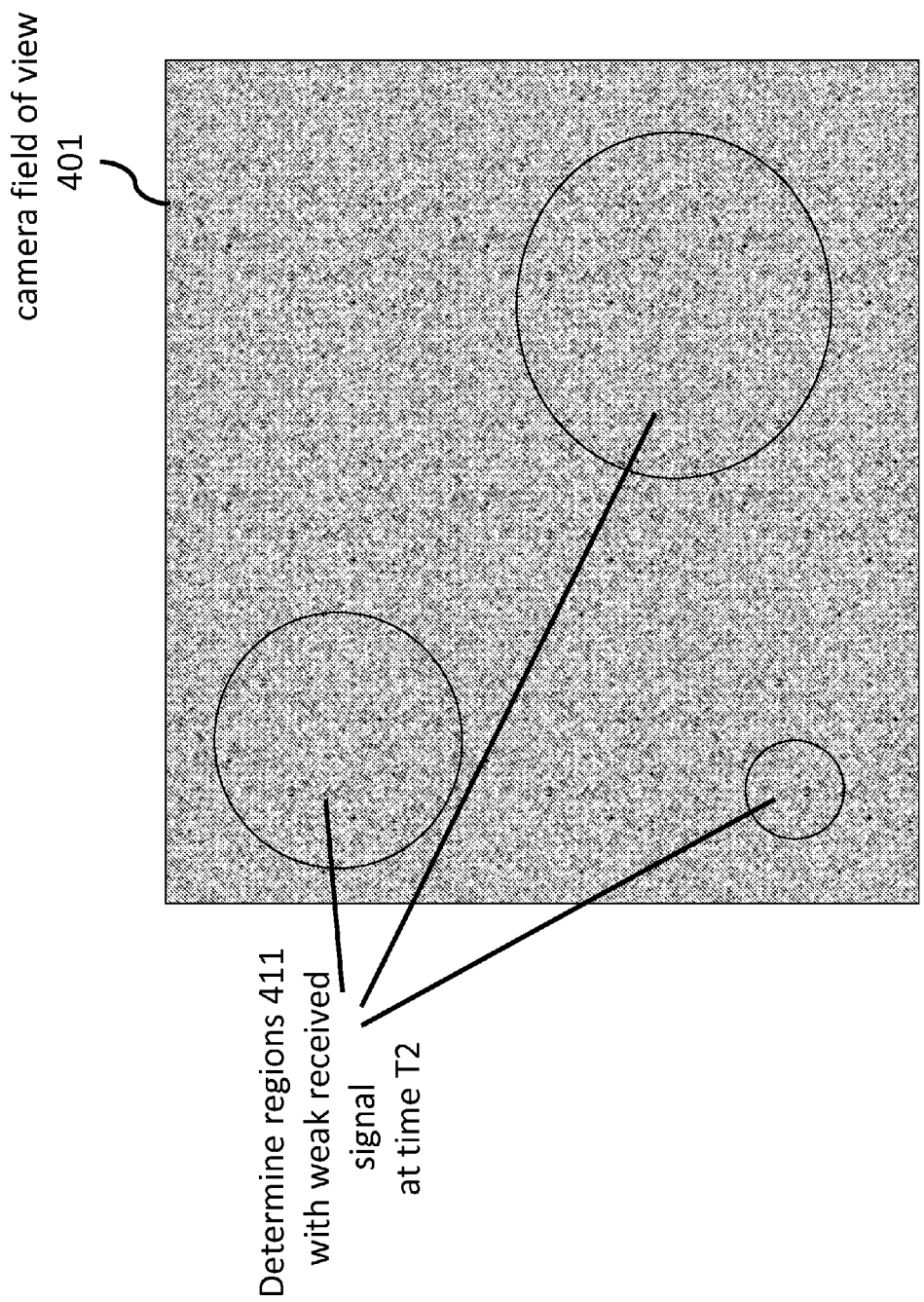

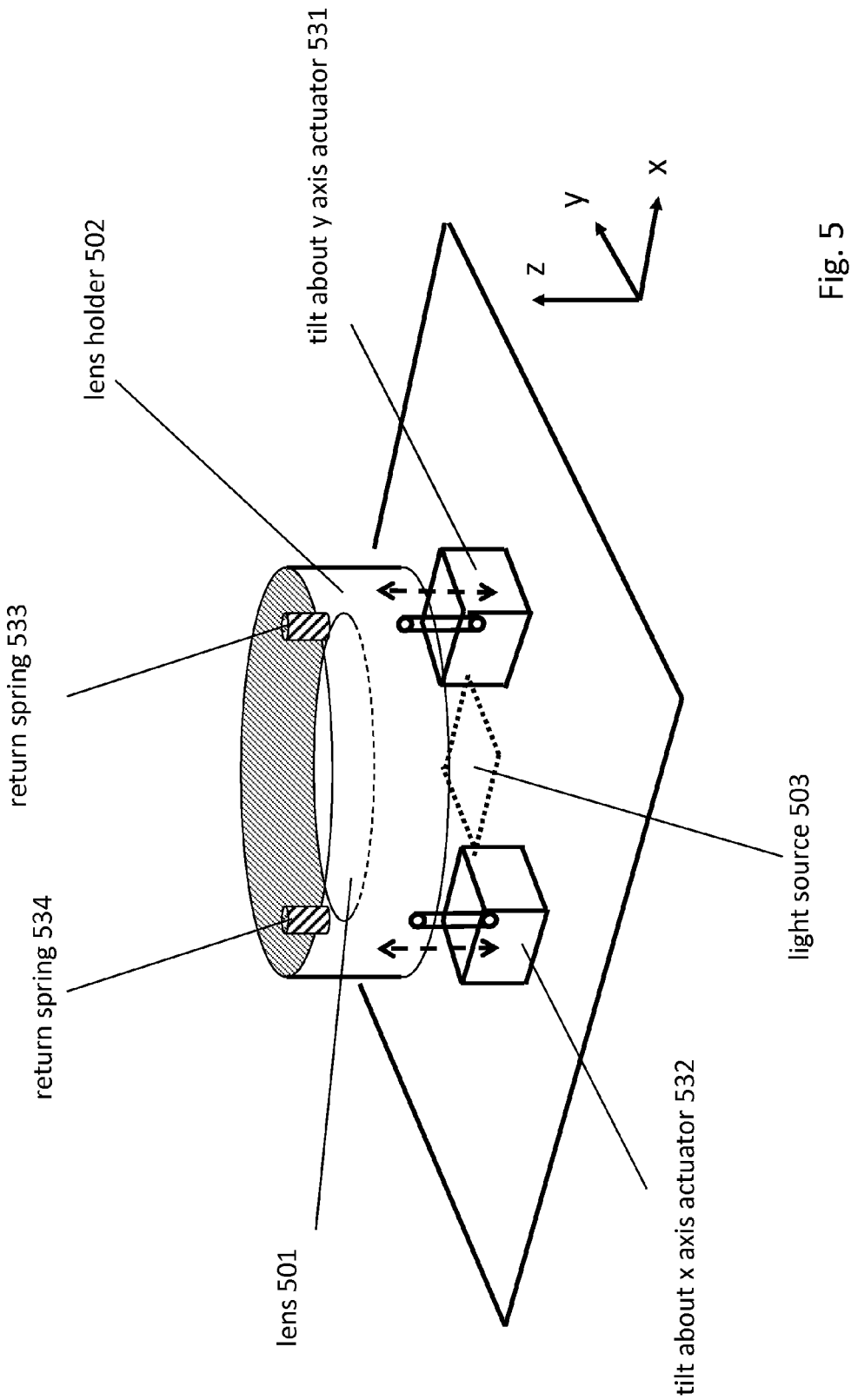

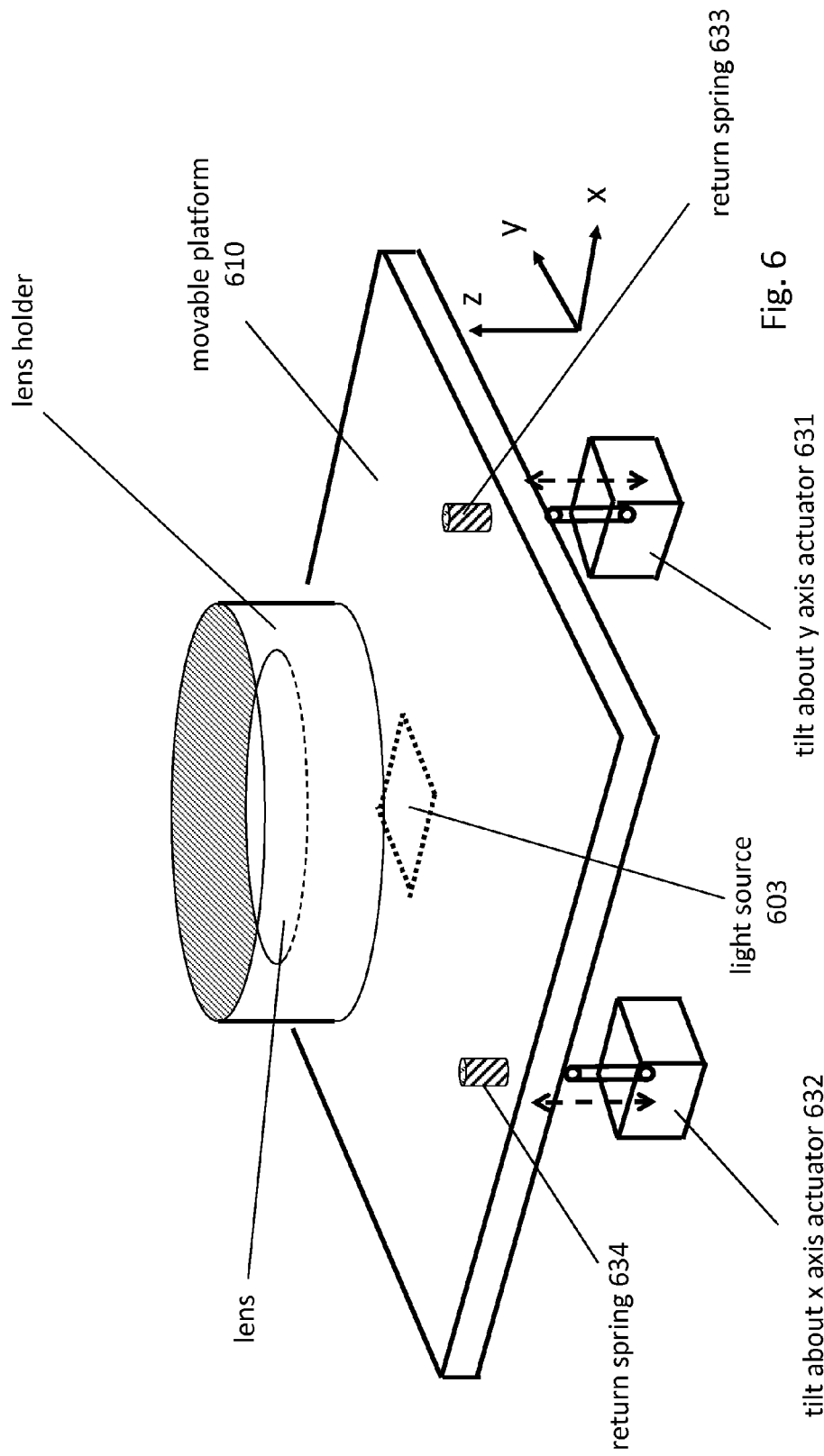

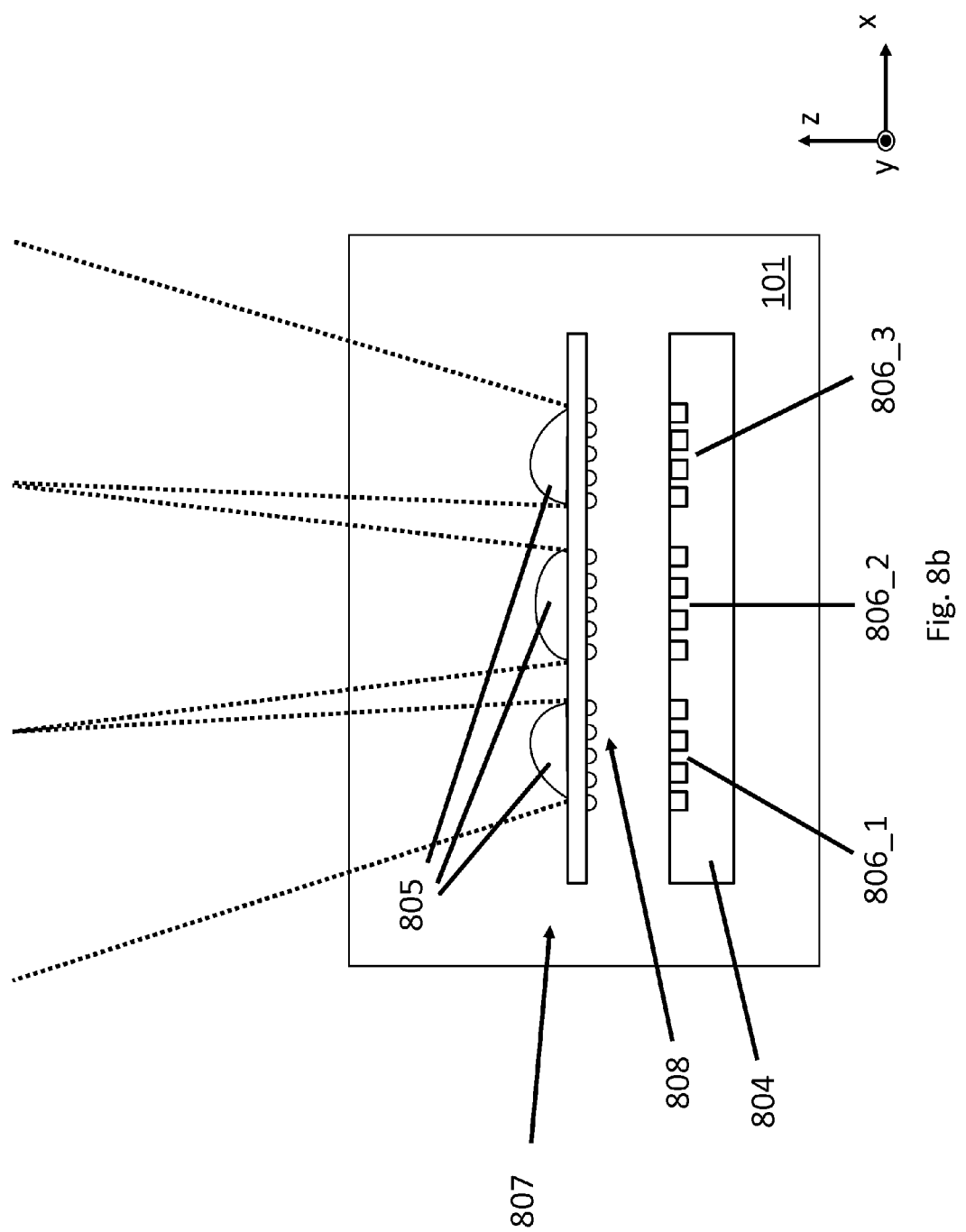

TIME-OF-FLIGHT CAMERA SYSTEM WITH SCANNING ILUMINATOR

RELATED CASES

This application is a continuation of and claims the benefit of U.S. patent application Ser. No. 14/579,158, titled "TIME-OF-FLIGHT CAMERA SYSTEM WITH SCANNING ILLUMINATOR", filed Dec. 22, 2014, which is incorporated by reference in its entirety.

FIELD OF INVENTION

The field of invention pertains to camera systems generally, and, more specifically, to a time-of-flight camera system with a scanning illuminator.

BACKGROUND

Many existing computing systems include one or more traditional image capturing cameras as an integrated peripheral device. A current trend is to enhance computing system imaging capability by integrating depth capturing into its imaging components. Depth capturing may be used, for example, to perform various intelligent object recognition functions such as facial recognition (e.g., for secure system un-lock) or hand gesture recognition (e.g., for touchless user interface functions).

One depth information capturing approach, referred to as "time-of-flight" imaging, emits light from a system onto an object and measures, for each of multiple pixels of an image sensor, the time between the emission of the light and the reception of its reflected image upon the sensor. The image produced by the time of flight pixels corresponds to a three-dimensional profile of the object as characterized by a unique depth measurement (z) at each of the different (x,y) pixel locations.

As many computing systems with imaging capability are mobile in nature (e.g., laptop computers, tablet computers, smartphones, etc.), the integration of a light source ("illuminator") into the system to achieve time-of-flight operation presents a number of design challenges such as cost challenges, packaging challenges and/or power consumption challenges.

SUMMARY

A time of flight camera system is described. The time of flight camera system includes an illuminator. The illuminator has a movable optical component to scan light within the time-of-flight camera's field of view to illuminate a first region within the field of view that is larger than a second region within the time-of-flight camera's field of view that is illuminated at any instant by the light. The illuminator also includes an image sensor to determine depth profile information within the first region using time-of-flight measurement techniques.

An apparatus is described having means for scanning light within a time-of-flight camera's field of view to illuminate a first region within the field of view that is larger than a second region within the time-of-flight camera's field of view that is illuminated at any instant by the light. The apparatus also includes means for determining depth profile information within the first region using time-of-flight measurement techniques.

FIGURES

The following description and accompanying drawings are used to illustrate embodiments of the invention. In the drawings:

FIGS. 1a(i) and 1a(ii) pertain to a first possible smart illumination feature;

FIGS. 1b(i), 1b(ii) and 1b(iii) pertain to a partitioned smart illumination approach;

FIGS. 1c(i) and 1c(ii) also pertain to a partitioned smart illumination approach;

FIGS. 1d(i) and 1d(ii) pertain to another possible smart illumination feature;

FIG. 1e shows an embodiment of a light source for a partitioned field of view;

FIGS. 2a through 2e pertain to scanning within a smart illumination system;

FIGS. 4a through 4c show an embodiment of a smart illumination method;

Figure 7:
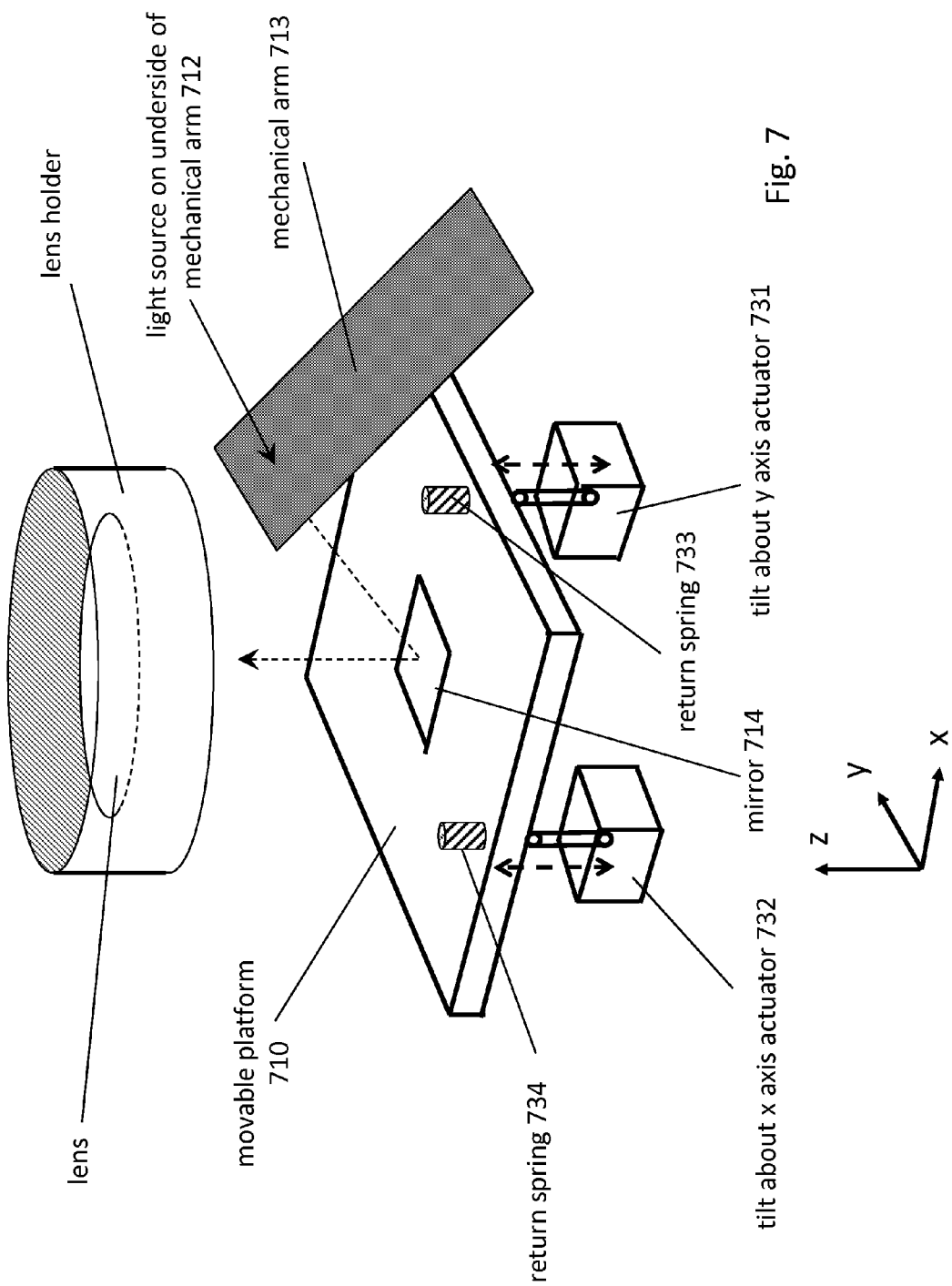
Figure 8A:
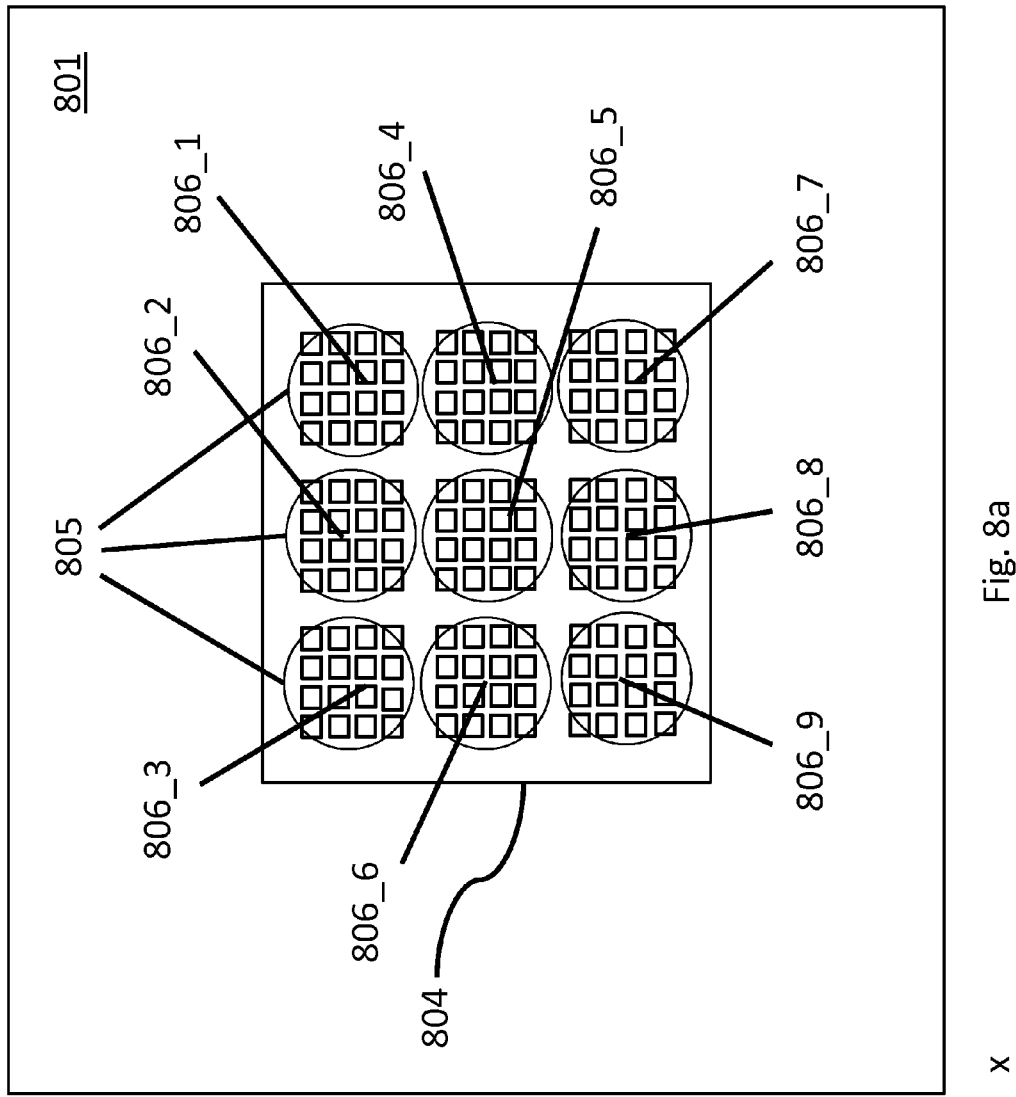
Figure 9:
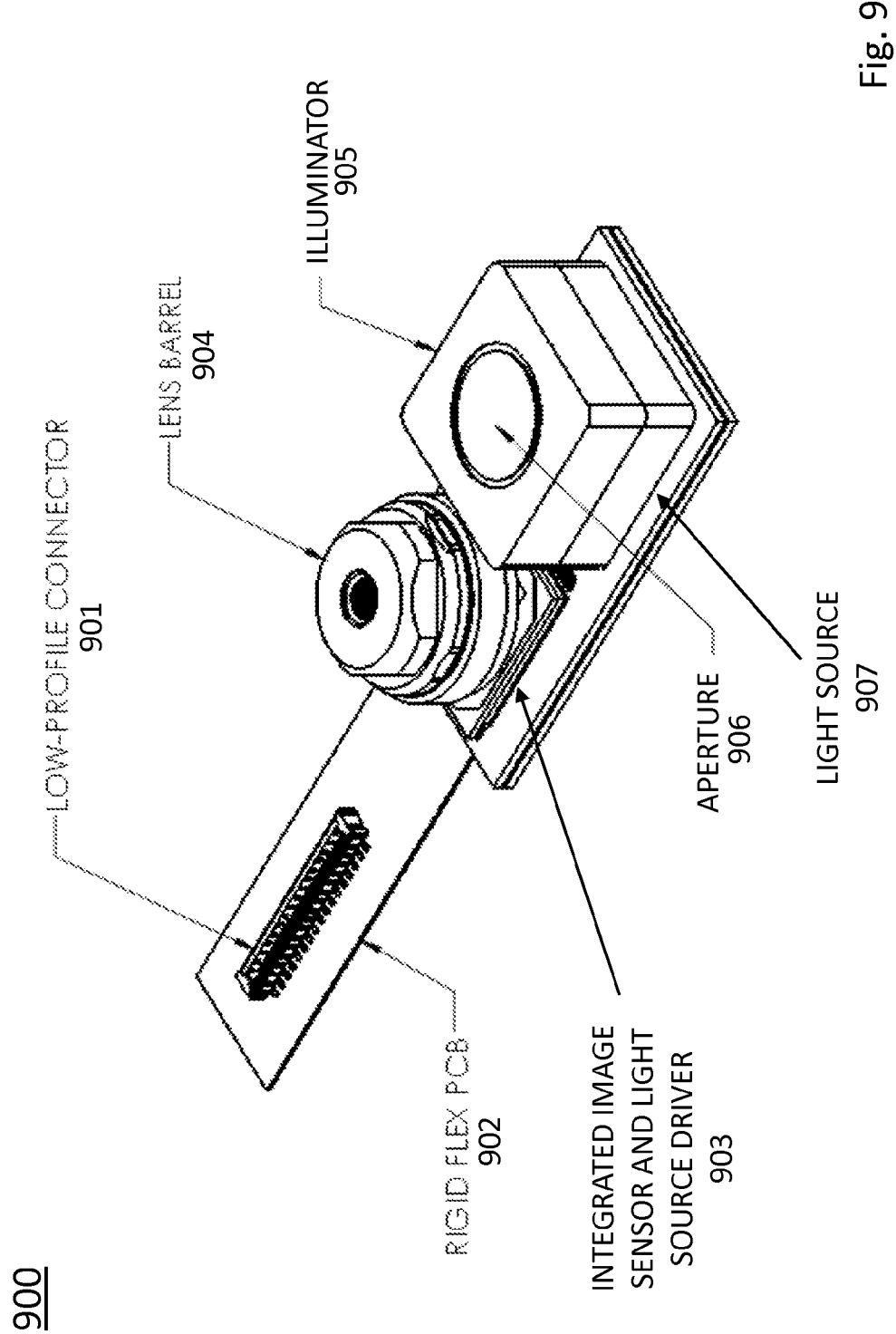
Figure 10:
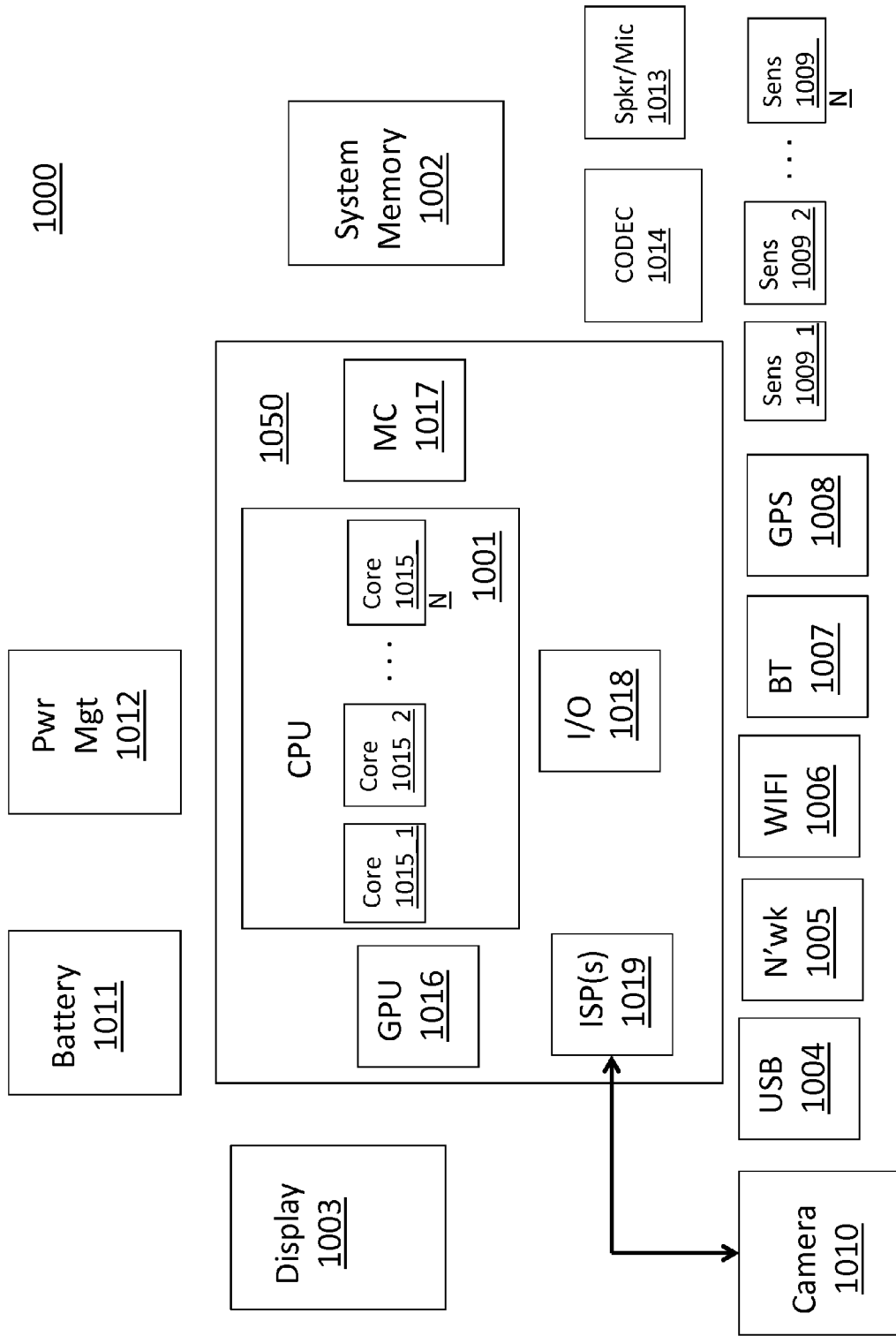

FIG. 5 shows a first illuminator embodiment;
FIG. 6 shows a second illuminator embodiment;
FIG. 7 shows a third illuminator embodiment;
FIGS. 8a and 8b show a fourth illuminator embodiment;
FIG. 9 shows a 2D/3D camera system;
FIG. 10 shows a computing system.

DETAILED DESCRIPTION

A "smart illumination" time-of-flight system addresses some of the design challenges referred to in the Background section. As will be discussed below, smart illumination involves the intelligent manipulation of any or all of the size, shape or movement of the emitted light of a time-of-flight system. Time-of-flight systems, and in particular time-of-flight systems that are integrated in a battery powered system, generally exhibit a tradeoff between the demands made on the power supply and the emitted and received strength of the optical signals.

That is, as the illuminated optical signal strength grows, the received optical signal strength improves. Better received optical signal strength results in better accuracy and performance of the time-of-flight system. However, supporting higher emitted optical signal strength results in a more expensive battery solution and/or greater drain on battery life, either of which can be a drawback on user enjoyment and/or acceptance of a system having time-of-flight measurement capability.

Smart illumination strives to address this issue by concentrating illuminated optical power into smaller areas of illumination that are directed on regions of interest in the camera field of view. By concentrating the optical power into smaller areas of illumination, received optical signal strength and time-of-flight system performance is enhanced without increasing the power draw from the battery. As such, the aforementioned user perceived drawbacks may be acceptably minimized.

Use of smaller regions of light involves the ability to direct smaller regions of illumination to regions of interest within the camera's field of view. A region of interest is, for example, an area within the field of view of the camera that is smaller than the camera's field of view and that is higher priority, in terms of obtaining depth information, than other areas within the field of view. Examples of a region of interest include a region where an object exists whose depth information is desired (e.g., a hand, a face) or a region where a previously taken time-of-flight measurement yielded poor received signal intensity.

As such, after a region of interest within the field of view is identified, the illumination system receives information indicative of the region of interest and concentrates optical intensity upon the region of interest. Concentrating optical intensity upon the region interest may involve emitting optical light at or near a power limit of the illuminator but directing that light primarily upon the region of interest.

A first example includes, for an illuminator having a single light source, emitting light from the light source at a power limit of the illuminator and focusing a smaller "spot" of the light at the region of interest. A second example includes, for an illuminator having multiple light sources, emitting light from one of the light sources at a power limit of the illuminator such that other ones of the light sources must be kept off and directing a beam of light from the illuminated light source toward the region of interest.

Other smart illumination schemes may take advantage of the illumination of a smaller region of interest by illuminating the region of interest with less than full illuminator power. For example, if a region of interest is small enough, sufficiently accurate information about the region may be obtainable with less than full illuminator power.

Possible features of various smart illumination systems are discussed at length below. In general, however, smart illumination systems may be designed to change either or both of the size and shape of an illuminated region in order to illuminate an object of interest within the camera's field of view. Additionally, smart illumination systems may be designed to change the location of an illuminated region, e.g., by scanning an emitted beam within the field of view.

FIGS. 1a through 1d as discussed below pertain to aspects of changing illuminated region size and shape. By contrast, FIGS. 2a through 2c as discussed below pertain to aspects of changing the location of an illuminated region.

FIGS. 1a(i) and 1a(ii) demonstrate that the size of an illuminated region may be adjusted in view of an object of interest to be illuminated. That is, in a first scenario 111 of FIG. 1a(i), a first, smaller object of interest 102 consumes a smaller area within the camera's field of view 101. As such, the size of the illuminated region of interest 103 that is emitted by the illuminator is contracted to encompass the smaller object of interest 102. By contrast, in scenario 112 of FIG. 1a(ii), a second, larger object of interest 104 consumes a larger area within the camera's field of view 101. As such, the size of the illuminated region of interest 105 that is emitted by the illuminator is expanded to encompass the larger object of interest 104.

The contraction and expansion of the size of the illuminated region 103, 105 can be accomplished, for example, with an illuminator having a movable optical component (e.g., a movable light source, a movable lens, a movable mirror, etc.). The controlled movement of an optical component within the illuminator can be used to controllably set the size of the illuminated region. Examples of illuminators having movable optical components are discussed in more detail further below with respect to FIGS. 5a through 5c.

Figure 1B:
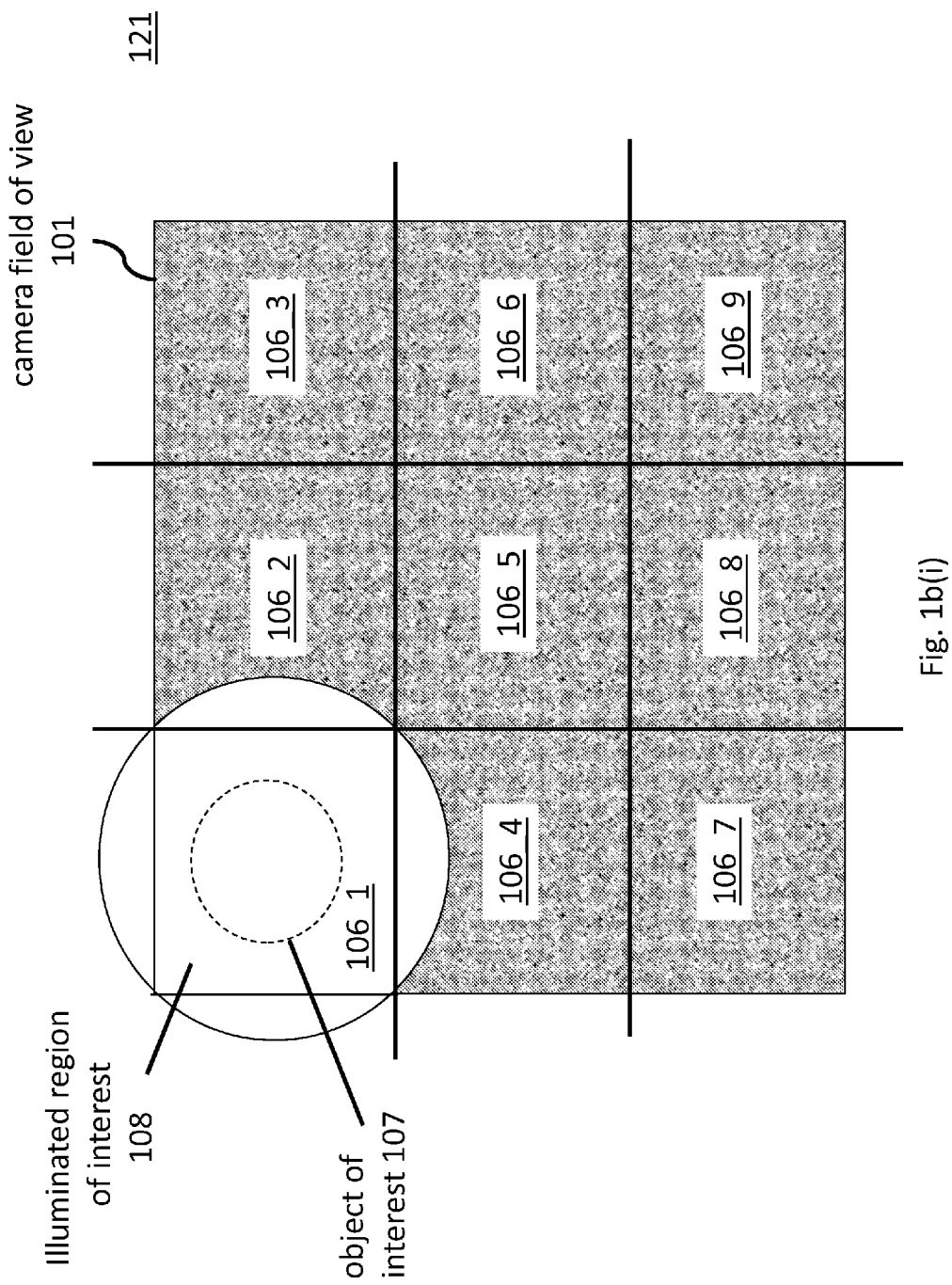

Alternatively, as observed in FIGS. 1b(i) and 1b(ii), the field of view 101 can be partitioned into different sections that can be individually illuminated (e.g., as observed in FIG. 1b(i), the field of view is partitioned into nine different sections 106_1 through 106_9). As observed in scenario 121 of FIG. 1b(i), a smaller object of interest 107 is illuminated by illuminating one of the partitions (partition 106_1). By contrast, as observed in scenario 122 of FIG. 1b(ii), a larger object of interest 109 is illuminated by illuminating four of the partitions (partitions 106_1, 106_2, 106_4 and 106_5). As such, the illuminated region of interest 110 of FIG. 1b(ii) is noticeably larger than the illuminated region of interest 108 of FIG. 1b(i).

Referring to FIG. 1b(ii) note that the entire field of view can be illuminated by illuminating all partitions simultaneously, or, by illuminating each partition individually in succession (or some mixture of the two approaches). The former approach is apt to induce weaker received optical signals. The later approach may be performed with higher optical concentrations on the individually illuminated partitions but at the expense of the time needed to "scan" the field of view. Here, illuminating each partition in succession corresponds to a form of scanning. Scanning is described in more detail further below with respect to FIGS. 2a through 2e.

The illumination of partitioned regions within the field of view can be accomplished with a partitioned light source. FIG. 1b(iii) depicts a top view (looking into the face of the illuminator) of an exemplary partitioned illuminator light source 117 having nine individual light sources 113_1 through 113_9. In various embodiments, each individual light source is implemented as an array of vertical cavity side emitting lasers (VCSELs) or light emitting diodes (LEDs) and is responsible for illuminating a particular partition. All of the individual light sources 113_1 through 113_9 may be integrated, for example, on a same semiconductor chip. In an embodiment, each individual light source is implemented as an array of light source devices (VCSELs or LEDs) so that the entire illuminator power budget can be expended illuminating only a single partition (in which case, the individual light sources for the other partitions must be off).

If illuminator light source 117 is used for scenario 121 of FIG. 1b(i), individual light source 113_1 would be on in order to illuminate partition 106_1. By contrast, if illuminator light source 117 is used for scenario 112 of FIG. 1b(i), individual light sources 113_1, 113_2, 113_4 and 113_5 would be on. More details about illuminators having a partitioned field of view and corresponding light source embodiments are described in more detail further below.

Figure 1C:

FIG. 1c(i) shows another partitioned approach in which the partitions themselves are not all of the same size. That is, there exist different partitions having different sizes. With partitions of different sizes, the size of the illuminated region can be changed by illuminating different sized partitions in sequence. For example, if only a smaller partition is illuminated and then only a larger partition is illuminated the size of the illuminated region will expand. An exemplary light source 119 for the partitioning approach of FIG. 1c(i) is observed in FIG. 1c(ii). Note that individual light sources that illuminate larger partitions have greater potential optical power output (e.g., as demonstrated by having more VCSELs or LEDs) than individual light sources that illuminate smaller partitions.

Note that the expansion and/or contraction of the size of the illuminated region for a same emitted optical power (whether by non-partitioned or partitioned mechanisms) involves a trade-off between the size of the illuminated region and the strength of the received signal. That is, for a same emitted optical power, a smaller illuminated region corresponds to a stronger received signal intensity. By contrast, again for a constant emitted optical power, a larger illuminated region corresponds to a weaker received signal.

If a larger illuminated region size is desired but without the loss in received signal strength, another tradeoff exists between the illuminated region size and the amount of power that will be consumed by the illuminator. That is, in order to increase the size of the illuminated region but maintain the received optical signal strength, the illuminator (without any scanning as described below) will generally need to emit more intense light which will cause the illuminator to consume more power.

Some smart illumination systems may be designed to maintain a minimum received optical signal strength at the image sensor. In situations where the illuminated region of interest contracts the emitted optical intensity may be reduced because a sufficiently strong optical intensity per unit of illuminated surface area can still be maintained. Conversely illuminator power may increase with an expansion of the size of the region of interest.

Additionally, in situations where the region of interest is smaller because the object to be illuminated is farther away, the emitted optical intensity may reduce only slightly, remain constant or even increase because received optical signal is generally inversely proportional with distance of the reflecting object from the camera. As such, a smart illumination system, besides considering the size of an object of interest may also consider its distance when determining appropriate illuminator optical power. A more thorough discussion of the factors that a smart illumination system may consider when setting the illumination characteristics are described in more detail below with respect to FIG. 3.

In various embodiments the shape of the illuminated region can be changed. FIG. 1d(i) shows a first scenario 131 is which a pointed beam when directed in the middle of the field of view is essentially circular, but, as observed in scenario 132 of FIG. 1d(ii), when the same beam is pointed to the corner of the field of view the illuminated region becomes more elliptical in shape. Movement of a pointed beam can be accomplished with an illuminator having a movable optical component as will be discussed in more detail below.

Figure 1E:
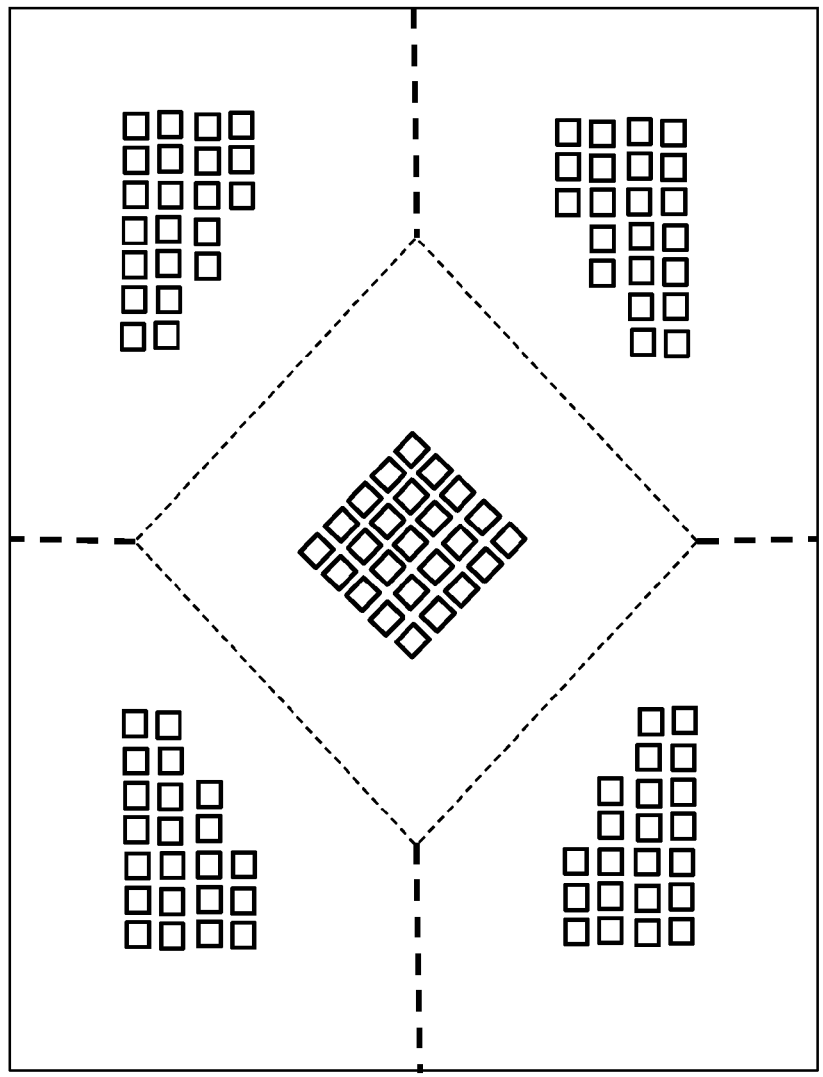

FIG. 1e shows an embodiment of a light source for a partitioned field of view approach where the partitions themselves have different shapes. As such, illuminating only a first partition having a first shape, a then only illuminating only a second partition having a second, different shape will correspondingly produce illuminated regions within the field of view that change shape.

FIGS. 1a through 1e discussed above pertain to smart illumination systems that can change the size and/or shape of the illuminated region as the system attempts to suitably illuminate the different objects of interest that may be present in the field of view of a time-of-flight camera system.

Figure 2A:
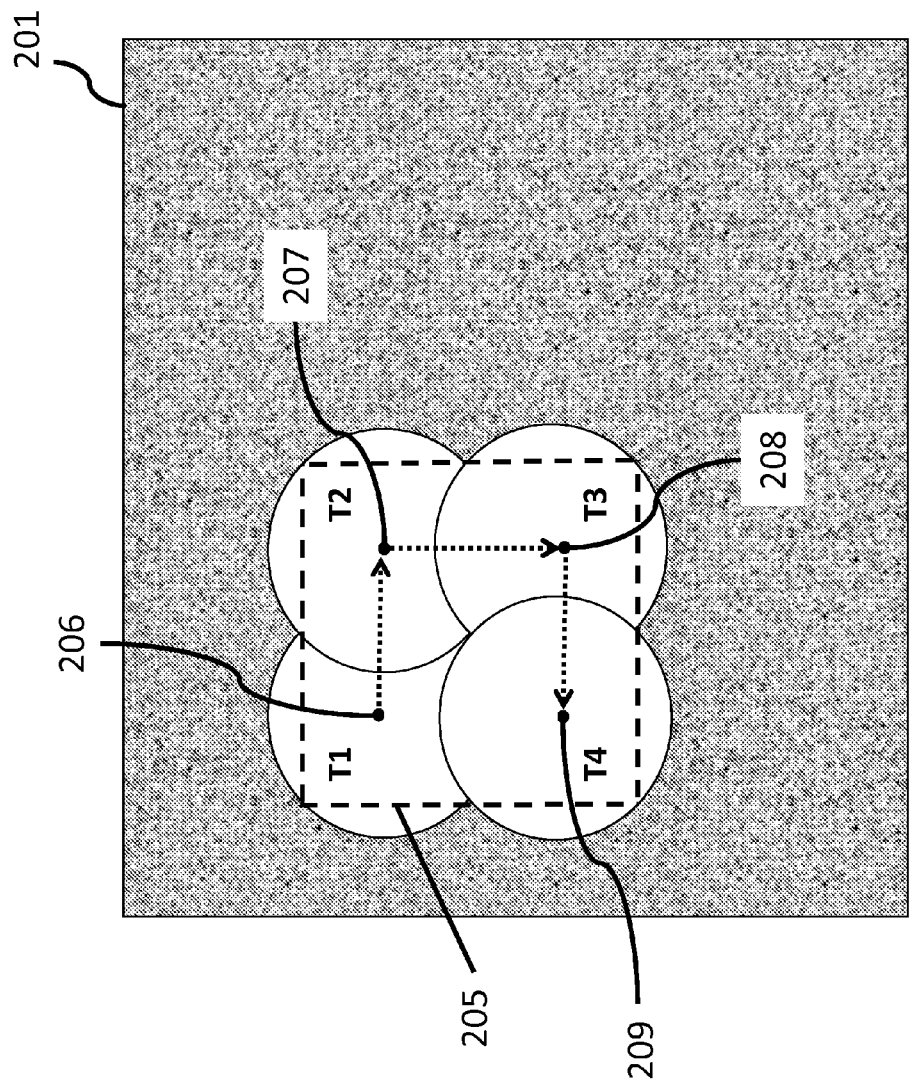
Figure 2C:
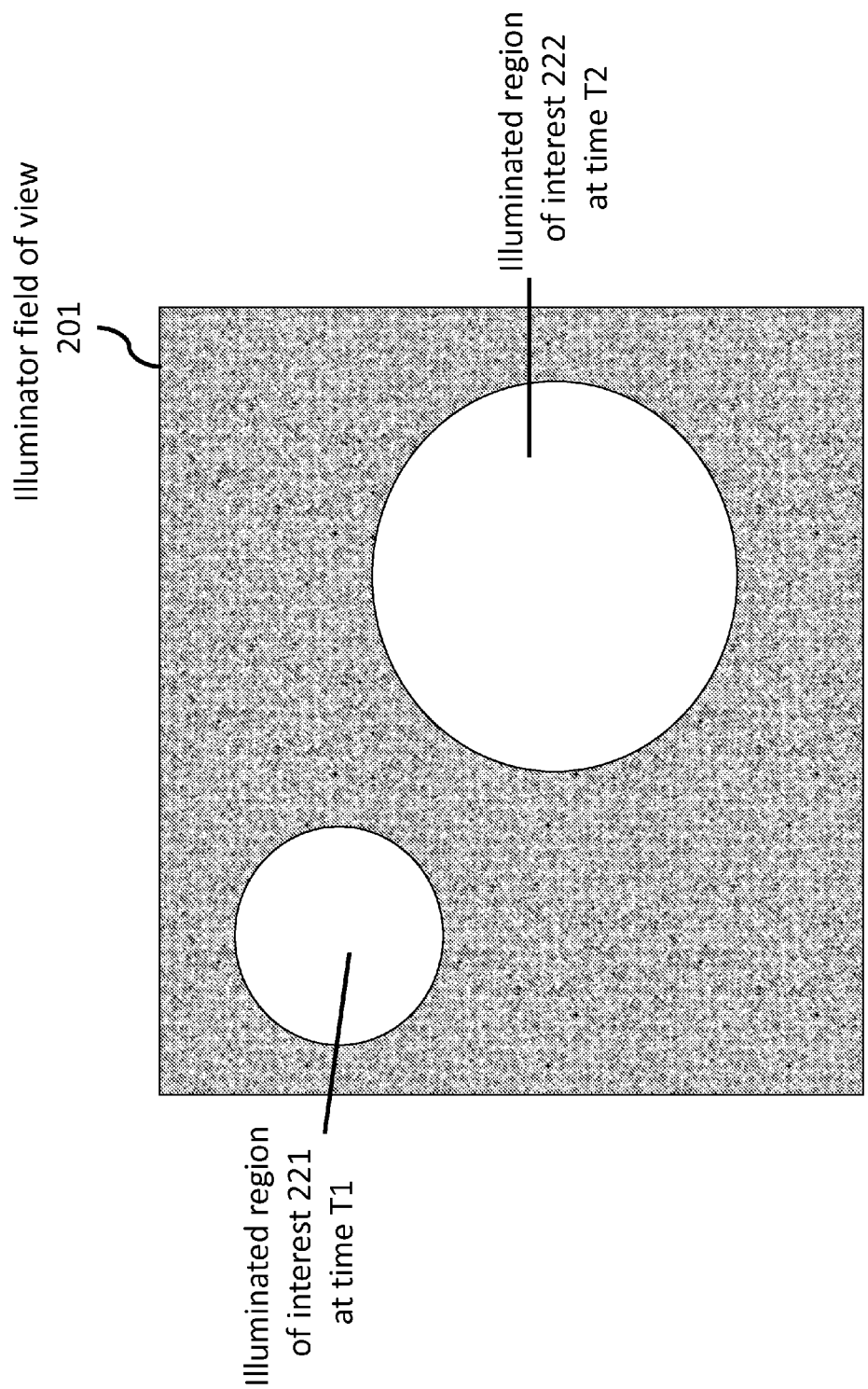

By contrast, FIGS. 2a through 2c pertain to the scanning of emitted light within the camera's field of view. Scanning involves the intelligent changing of regions that receive illumination over time in order to capture an overall region of interest that is larger than the size(s) of the illuminated region(s) themselves. Here, recall from the discussion of FIGS. 1a through 1e above that as the region of interest expands, emitted optical intensity may have to be increased in order to maintain sufficiently strong illumination and corresponding received signal strength. Conceivably some regions of interest may be large enough where the appropriate emitted optical intensity exceeds a desired or permitted power budget for the illuminator.

Scanning helps maintain or enhance received signal strength over larger regions of interest but without corresponding increases in emitted optical power intensity. That is, for example, by scanning an illuminated smaller "spot" over a larger region of interest, depth information can be collected for the larger region of interest even though optical power that is sufficient only to illuminate the smaller spot is expended.

FIG. 2a shows an example of scanning as described just above. As observed in FIG. 2a, a larger object of interest 205 is illuminated by scanning a smaller illuminated region initially from position 206 at time T1 to position 207 at time T2 and then to position 208 at time T3 and finally to position 209 at time T4. The scanning of FIG. 2a may be achieved, for example, with an illuminator having a moving optical component that is able to point and sweep a beam of light in a scanning motion within the field of view.

Alternatively or in combination, as observed in FIG. 2b, scanning may be achieved with a partitioned illumination system by illuminating different partitions in an on and off sequence. That is, as observed in FIG. 2b, a first partition 211 is illuminated at time T1. Subsequently, at time t2, the first partition 211 is turned off and a second partition 212 is turned on. Similar sequences subsequently occur at times t3 and t4 for third and fourth partitions 213, 214. Accordingly, a region of interest within all four partitions can be illuminated over times t1 through t4.

FIG. 2c shows that scanning may be disjointed. That is, the embodiments of FIGS. 2a and 2b assumed that a next region to be illuminated in a scan was adjacent to a previous region that was just illuminated. By contrast, FIG. 2c illustrates that a scan may include illuminating two separate regions that are not adjacent. Here, at time T1 a first region 221 is illuminated. Then, at time T2, a second region 222 is illuminated where the two regions are not adjacent to one another within the field of view. Disjointed scanning may be performed, for example, when a "region of interest" includes two or more different, non adjacent areas or items within the field of view that need to be illuminated. Disjoint scanning may be performed with partitioned as well as non partitioned illumination schemes.

Note that the example of FIG. 2c also shows that the size of the illuminated region may change over a scanning sequence (illuminated region 222 is larger than illuminated region 221). Changing illuminated region size over the course of a scan is not limited to disjointed scans and may be a feature of continuous scans such as the scans of FIGS. 2a and 2b discussed above. In the case of partitioned scans, changing the size of the illuminated region is possible, e.g., by first turning on one partition and then turning on multiple partitions.

FIG. 2d further illustrates that some partitioned smart illumination systems may be designed to perform scanning within a partition. That is, the illuminator may have both a partitioned light source and movable optical components so that a smaller beam within a partition is scanned within the surface area of the partition to effectively illuminate the partition. As observed in FIG. 2d, an illumination "spot" that is smaller than the size of a partition is scanned within the upper left partition to effectively illuminate the upper left partition. The entire field of view can be scanned by scanning each partition in succession (sequentially) or simultaneously (as discussed further below with respect to FIG. 2e) or some mixture of these two approaches.

As discussed above, various illuminator embodiments are capable of changing the size of the illuminated region (by changing the cross section of the bean of emitted light) while other illuminator embodiments embrace a partitioned approach in which the field of view is partitioned and the illuminated is capable of individually illuminating each partition. The approach of FIG. 2d can be integrated into an illuminator having both of these characteristics. That is, an illuminator whose design supports changing the size of the illuminated region can conceivably form a beam large enough to illuminate an entire partition and also form a beam smaller than the entire partition so that it can be scanned within the partition.

FIG. 2e shows another partitioned scanning approach in which respective partitions are scanned simultaneously with their own respective light beams. In an embodiment, the illuminator is designed to not only direct a separate light beam to each partition simultaneously but also be able to scan the light beams. Embodiments of an illuminator design capable of simultaneously scanning multiple partitions within the field of view are described in more detail further below.

Note that although the embodiment of FIG. 2d is directed to a partitioned approach, other embodiments may scan over a region where the illuminator design does not fully embrace a partitioned designed (e.g., a particular beam of light can be directed anywhere in a field of view). Simultaneous scanning of multiple beams, however, includes each beam having its own respective region in which to scan. Such regions may be deemed to be partitions during the simultaneous multiple beam scanning sequence.

Any of the scanning approaches of FIGS. 2a through 2e discussed above may introduce a tradeoff between the time it takes to collect the time-of-flight information for a region of interest and the size of the region of interest. That is, for a constant illuminated region size (e.g., a "spot size"), as the size of the region of interest to be illuminated grows more scanning time will be consumed. Contra-wise, if the region of interest is increased, scanning time can be reduced by increasing the size of the illumination but at the expense of increased emitted optical power (if optical intensity per unit area is to be maintained) or received signal intensity (if optical intensity per unit area is permitted to fall).

The discussion of FIGS. 1a through 1e and 2a through 2d highlighted some basic tradeoffs that may exist in a smart illumination system such as a: 1) a tradeoff between illuminated region size and received signal strength; 2) a tradeoff between received signal strength and illuminator power consumption; 3) a tradeoff between illuminated region size and scanning time; 4) a tradeoff between illuminator power and the distance between an object of interest and the camera. An additional tradeoff may include the reflectivity of the object of interest and emitted optical power. Here, a typical time-of-flight illuminator will emit infra-red (IR) light. If the object of interest to be illuminated substantially reflects IR light, the illuminator may emit less optical power. By contrast, if the object of interest to be illuminated does not reflect IR light particularly well, the illuminator may increase its emitted optical power.

Which tradeoffs control and/or which direction and how heavily any particular tradeoff should be weighed is apt to be a function of the particular circumstances surrounding any particular illumination scenario.

For example, consider a situation where an object of interest to be illuminated is of modest size and is far away from the camera. Here, if the available power budget is large and there is a desire for a complete reading in a short amount of time, a smart illumination control system may choose to fully illuminate the object's region with high illuminator power without any scanning. By contrast, in another situation in which the object of interest is large and is close to the camera but where the available power budget is small and the need for a complete reading immediately is lacking, the same smart illumination system may choose to form a smaller illuminated region and scan it over the region of interest.

From these examples it should be clear that a smart illumination system may consider the surrounding conditions before illuminating a particular region of interest with a specific illuminated region size, illuminator power and whether any scanning is to take place.

Figure 3:
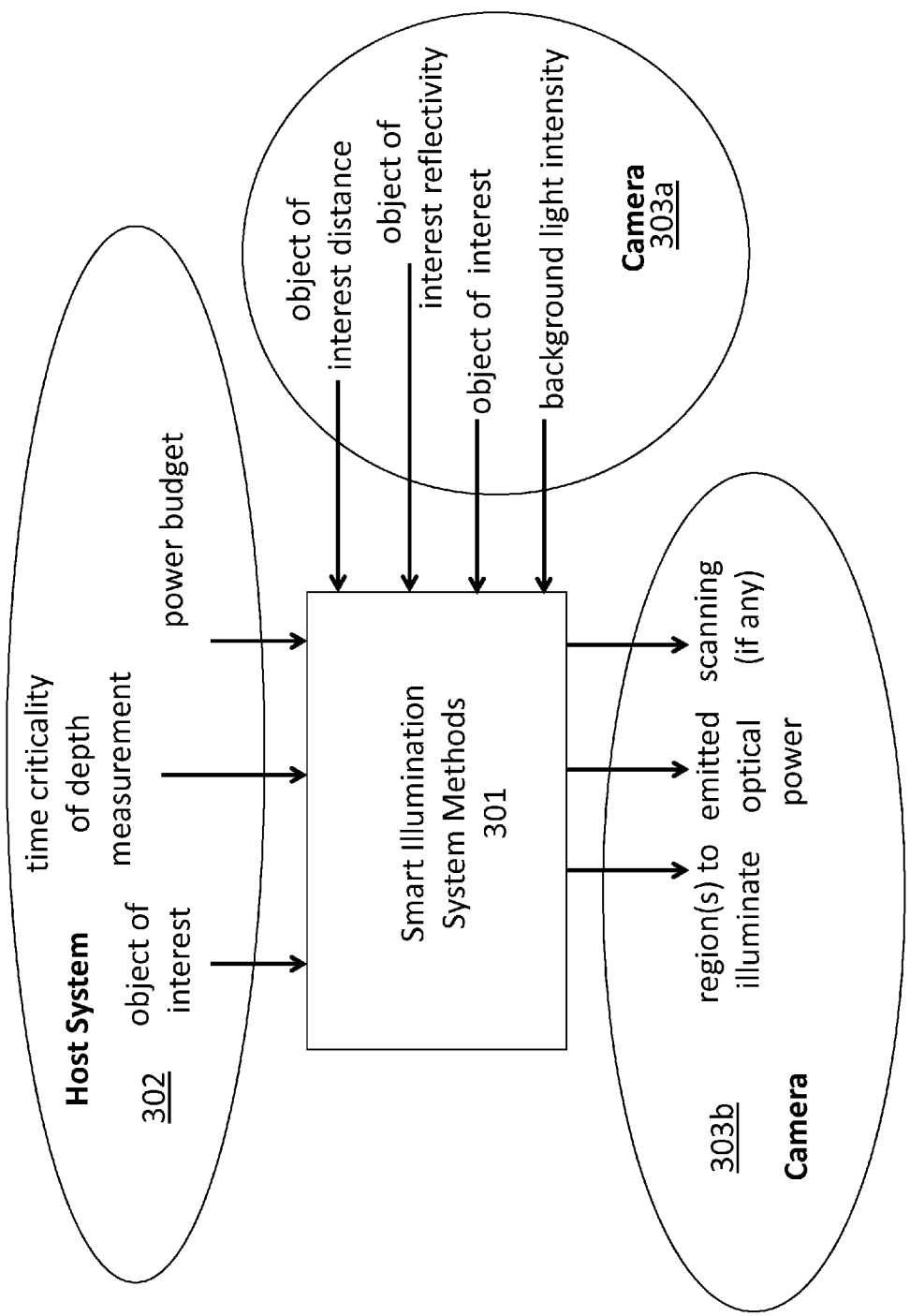
FIG. 3 shows an embodiment of a smart illumination system.

FIG. 3 shows the integration of smart illumination technology 301 into a working computing system such as a handheld tablet or smartphone. Here, the smart illumination technology may be implemented, e.g., partially or wholly in the device driver software and/or firmware for an integrated camera device that includes time-of-flight measurement capability. The software/firmware may be stored, e.g., in non volatile memory of the computing system (e.g., in FLASH firmware or system storage).

As observed in FIG. 3, the smart illumination technology software/firmware may be realized as a system of methods that are designed to strike appropriate balances amongst the aforementioned tradeoffs given a set of input parameters that correspond to the surrounding conditions of a depth profiling image capture sequence.

As observed in FIG. 3, the smart illumination methods 301 may accept one or more of the following input parameters from the host system 302: 1) the object of interest (which may be specified as what the object is (e.g., hand, face, etc.) and/or characteristics of the object's location and/or shape within the field of view); 2) how time critical the time-of-flight measurement is (how quickly it needs to be performed); and, 3) the power budget of the time-of-flight system and/or its illuminator (e.g., specified as a maximum permitted power). The components of the host system 302 that generate these input parameters may include an intelligent object recognition software application and/or hardware logic circuit component (e.g., for facial recognition, hand recognition etc.). Power management software, firmware and/or hardware of the host system 302 may generate the power budget input information.

The smart illumination methods 301 may also accept input information from the camera system 303b itself such as: 1) the distance between the object of interest and the camera; 2) the reflectivity of the object of interest; 3) the location and/or shape of the object of interest; 4) the intensity of the background light. Any of the input parameters provided by the camera may be provided after initial illumination of the object (or the field of view generally). That is, e.g., as an initial response to input from the host system 302, the time-of-flight system may initially illuminate the object and/or field of view as a first pass. Data collected from the first pass is then presented to the smart illumination methods 301 so that they can better optimize the capture of the object in terms of which regions are illuminated and how intense the emitted light should be.

With the applicable input parameters the smart illumination methods 301 effectively determine which tradeoffs control and/or which direction and how heavily any particular tradeoff should be weighed in order to generate image capture control commands for the camera 303b that specify what region(s) to illuminate, the intensity of the emitted light, whether any scanning applies and, e.g., if so applicable scanning parameters (e.g., time to scan, velocity of scan, scanning pattern, etc.).

Figure 4A:
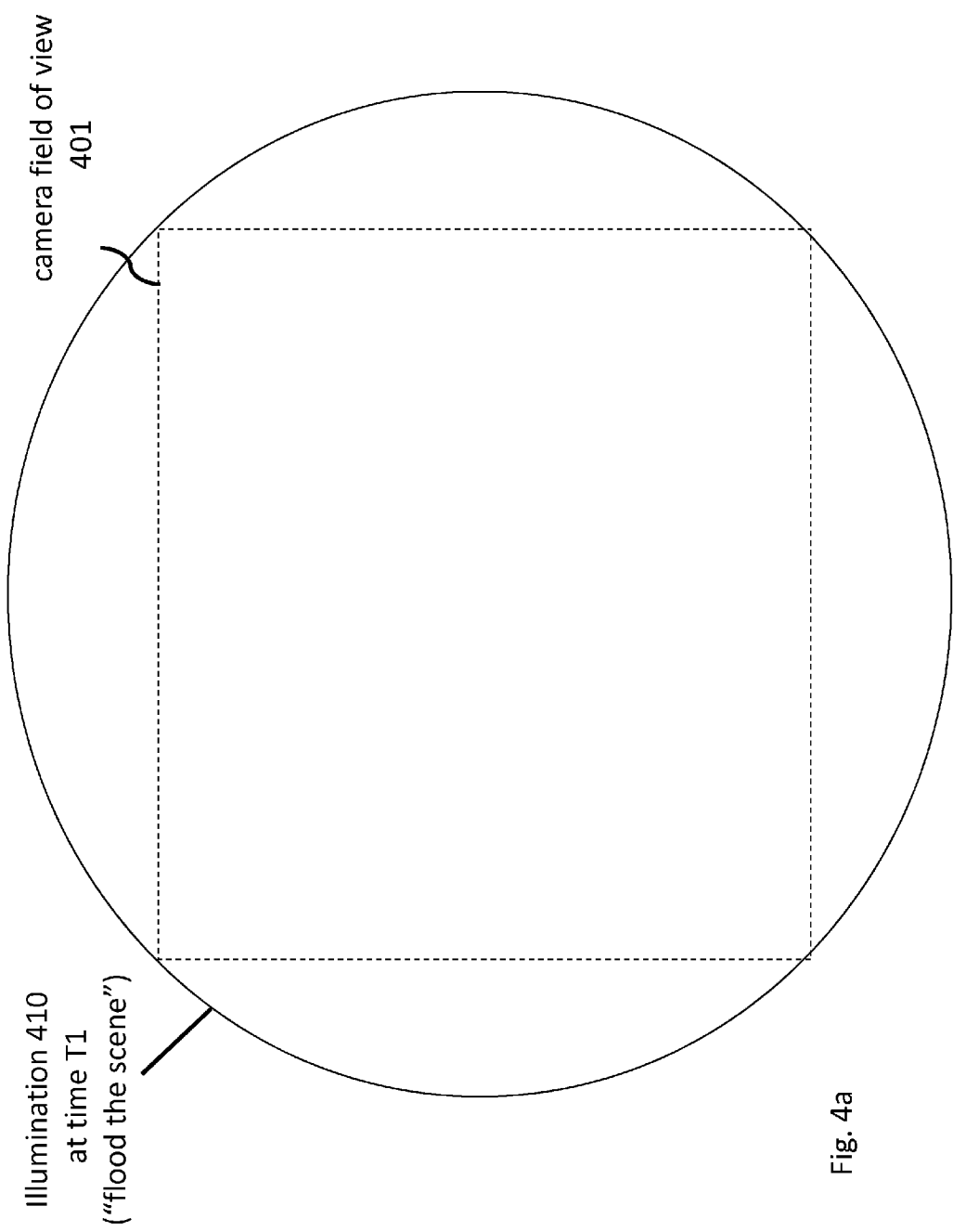
Figure 4C:
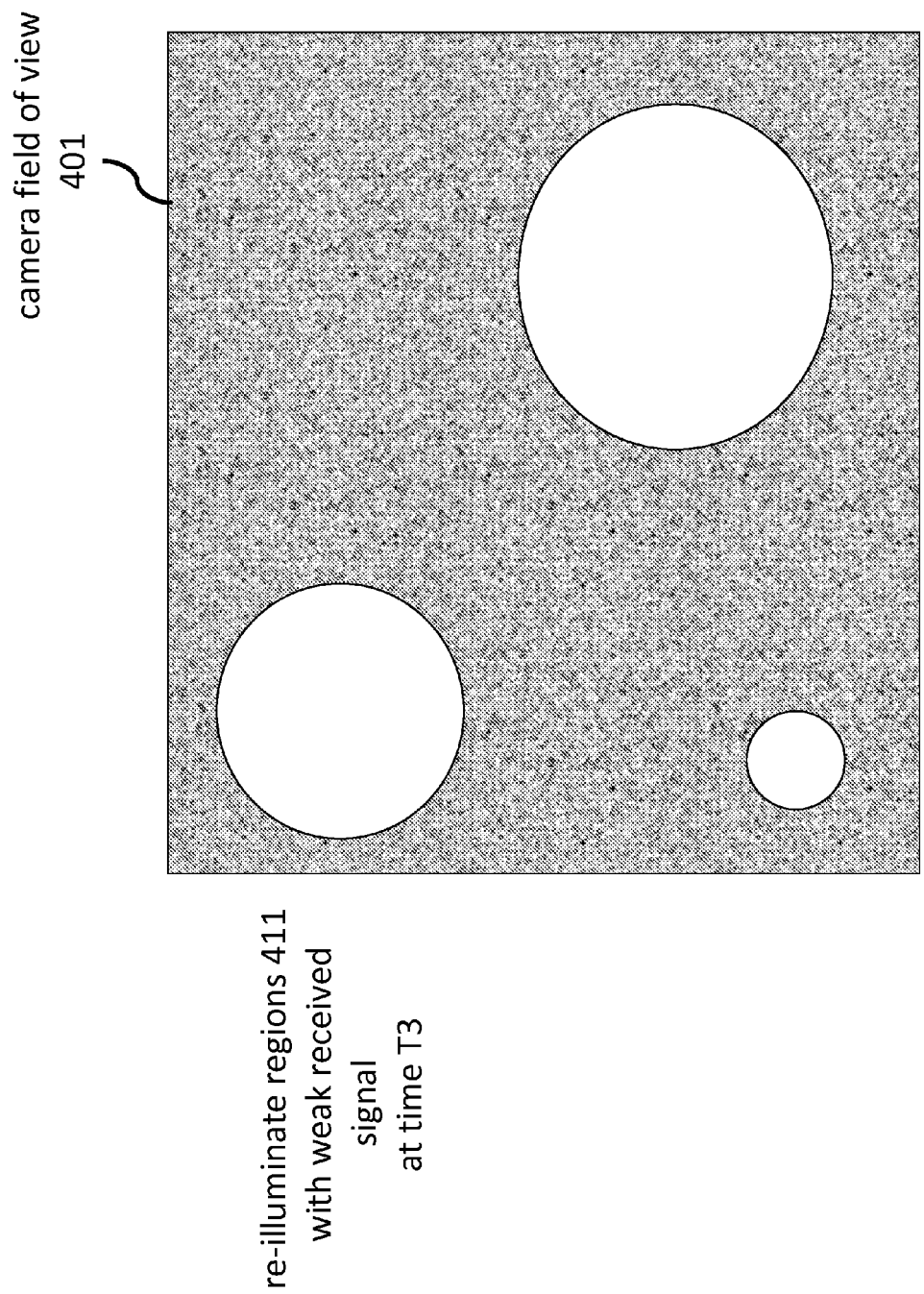

FIGS. 4a through 4c show another embodiment of a method that the smart illumination methods 301 of FIG. 3 may be designed to perform. As observed in FIG. 4a, initially, a large area 410 that, e.g., substantially covers the camera's field of view 401 is first illuminated by the time-of-flight illuminator. In some embodiments, as observed in FIG. 4a, the large area 410 may correspond to the entire field of view 401. In other embodiments the large area 410 may correspond to a substantial portion but less than the entire field of view 401 (e.g., approximately 33%, 50%, 66%, 75% of the field of view 410). Here, note that the illumination of a large area 410 within the field of view 401 may correspond to weaker received optical intensities because the emitted illumination is "spread out" over a wider surface area.

The image sensor that receives the reflected light includes circuitry (such as sense amplifier circuitry) that measures the received signal intensity against some threshold at each pixel. Those of the pixels that received light at a weak optical intensity are identified (e.g., the pixels whose received optical intensity fell below the threshold are identified). In many situations, as observed in FIG. 4b, it is expected that groups of neighboring pixels will fall below the threshold which, in turn, corresponds to the identification of regions 411 within the field of view 401 that received a weak optical signal.

Here, a smart illumination method 301 of FIG. 3 may receive signal intensity information for all of the image sensor's pixels and apply the threshold to determine the size and location of regions 411, or, alternatively, may only receive the identity of the pixels that fell below the threshold and from them determine regions 411. Upon recognition of the weak signal regions 411, the smart illumination method will proceed, as observed in FIG. 4c, to direct commands to the time-of-flight illuminator to re-illuminate these same regions 411.

The re-illumination is performed with more concentrated light to "boost" the optical intensity directed to the regions 411. The concentration is effected through the formation of smaller regions of illuminated light (as compared to illuminating the entire field of view), e.g., with the same amount of illuminator intensity that was emitted when the field of view was flooded. With the re-illumination of these regions with stronger light, the time-of-flight measurement should be complete in that the pixels that previously received a weak optical signal will now receive a sufficiently strong optical signal.

In the case of an illuminator having a movable optical component, the portions of the field of view requiring re-illumination can be re-illuminated by moving one or more optical components to direct a beam of light onto each region. In the case of an illuminator having a partitioned field of view, the portions of the field of view requiring re-illumination are re-illuminated by illuminating their corresponding partitions. In one embodiment, the same total amount of optical power used to initially illuminate the entire field of view may be the same as the total amount of power used to illuminate only a partition that is re-illuminated.

FIGS. 5 through 8a,b provide different embodiments of illuminators that are capable of performing the smart illumination techniques discussed above.

FIG. 5 shows an embodiment of an illuminator having a movable lens assembly 501, 502 for adjusting the size of the illuminated region (by moving the lens vertically above the light source) as well as scanning the illumination region or at least directing the illumination to any area with the camera's field of view (by tiling the plane of the lens above the light source).

As observed in FIG. 5, a light source 503 sits beneath the lens 501 and, when illuminated, the emitted light propagates through the lens and into the camera's field of view. The light source 503 may be implemented, for example, as a semiconductor chip having an array of infra-red (IR) VCSELs or LEDs. The use of the array helps "boost" maximum optical output power which runs approximately coextensively with NL where N is the number of VCSELs/LEDs in the array and L is the maximum output power of each VCSEL/LED. In an embodiment, all VCSELs/LEDs in the array receive a same drive current so that the emitted optical power of each VCSEL/LED is approximately the same as the other VCSELs/LEDs in the array. Optical output power is controlled by controlling the magnitude of the drive current.

A pair of voice coil motors 531, 532 each with spring return 533, 534 are used as actuators to define the vertical position of each of two points along the outer edge of the lens 501. The tilt angle of the lens 501 about the y axis is substantially defined by the force of a first motor 531 as applied against its return spring 533. The tilt angle of the lens 502 about the x axis is substantially defined by the force of a first motor 532 as applied against its return spring 534. From these basic scenarios, any tilt angle for the lens can be established as a function of the respective forces applied by the motors and the counteractive forces applied by the springs. On opposite sides of the lens holder 501 from the return springs may exist hinged pins or ball joints, for example, to permit the lens holder 501 to pivot around both the x and y axis.

Additionally, the vertical positioning of the lens 501 can be established by actuating the two motors 531, 532 equally. That is, if both motors 531, 532 extend an equal amount outward the lens will be raised in the +z direction. Correspondingly, if both motors 531, 532 recess an equal amount inward the lens will be lowered in the −z direction. Instead of the aforementioned hinged pins or ball joints, one or more additional voice coil motor actuators may be located along the periphery of the lens holder 502 to further stabilize both tilt angle and vertical positioning of the lens (e.g., three actuators spaced 120° apart, four actuators spaced 90° apart, etc.).

FIG. 6 shows an illuminator having a movable light source 603. The light source itself may be implemented as the light source 503 discussed above with respect to FIG. 5. In the approach of FIG. 6, the lens assembly positioning remains substantially fixed but a platform or substrate 610 that the light source 603 is mounted on is movable according to the same principles discussed above with respect to the lens holder 502 of FIG. 5. That is, a set of voice coil motor actuator and return spring pairs 631/633, 632/634 can be used to effect a tilt angle of the platform 610 about either or both of the x and y axes. Changing the tilt angle of the platform changes the angle of incidence of the emitted light into the lens, which, in turn, will change the pointing direction of the beam of light that is emitted from the lens into the camera's field of view.

A third voice coil actuator and return spring pair (not shown) may be coupled on an edge of the platform 610 other than the two edges where voice coil motor actuator and return spring pairs 631/633, 632/634 are located to effect vertical movement of the platform 610 along the z axis, which, in turn, will affect the size of the illuminated region (spot size) in the camera's field of view.

FIG. 7 shows another illuminator embodiment in which a light source 712 is affixed to the underside of a mechanical arm 713 oriented at an angle that positions the light source to direct light to a mirror 714 mounted on a movable platform 710. A lens and lens holder are fixed in position above the mirror so that light that is reflected off the surface of the mirror propagates through the lens and into the camera's field of view. The light source may be implemented as described above with respect to FIGS. 5 and 6.

A set of voice coil motor actuator and return spring pairs 731/733, 732/734 can be used to effect a tilt angle of the platform 710 about either or both of the x and y axes. Changing the tilt angle of the platform 710 changes the angle of incidence of the emitted light into the lens, which, in turn, will change the pointing direction of the beam of light that is emitted from the lens into the camera's field of view.

A third voice coil actuator and return spring pair (not shown) may be coupled on an edge of the platform 710 other than the two edges where voice coil motor actuator and return spring pairs 731/733, 732/734 are located to effect vertical movement of the platform 710 along the z axis, which, in turn, will affect the size of the illuminated region (spot size) in the camera's field of view.

Either of the illuminator designs of FIGS. 6 and 7 may be enhanced to include a movable lens arrangement as discussed in FIG. 5. Adding movable lens capability to the designs of FIGS. 6 and 7 may, for example, provide faster scanning times and/or larger emission angles from the illuminator. Each of the movable platforms 610, 710 of FIGS. 6 and 7 may be implemented as a micro-electrical-mechanical (MEM) device to place the light source (FIG. 6) or mirror (FIG. 7) in any location on the xy plane.

FIGS. 8a and 8b show an embodiment of an illuminator that is designed to individually illuminate different partitions within the field of view. As observed in FIGS. 8a and 8b the illuminator 801 includes a semiconductor chip 804 having a light source array 806_1 through 806_9 for each partition within the field of view. Although the particular embodiment of FIGS. 8a and 8b show nine field of view sections arranged in an orthogonal grid, other numbers and/or arrangements of partitions may be utilized. Likewise, although each light source array is depicted as a same sized N×N square array other array patterns and/or shapes including different sized and/or shaped arrays on a same semiconductor die may be utilized. Each light source array 106_1 through 106_9 may be implemented, for example, as an array of VCSELs or LEDs.

Referring to FIGS. 8a and 8b, in an embodiment, the illuminator 801 also includes an optical element 807 having a micro-lens array 808 on a bottom surface that faces the semiconductor chip 804 and having an emission surface with distinct lens structures 805 for each partition to direct light received from its specific light source array to its corresponding field of view partition. Each lens of the micro-lens array 808 essentially behaves as a smaller objective lens that collects divergent light from the underlying light sources and shapes the light to be less divergent internal to the optical element as the light approaches the emission surface. In one embodiment, there is a micro-lens allocated to and aligned with each light source in the underlying light source array although other embodiments may exist where there is more or less micro-lenses per light source for any particular array.

The micro-lens array 808 enhances optical efficiency by capturing most of the emitted optical light from the underlying laser array and forming a more concentrated beam. Here, the individual light sources of the various arrays typically have a wide emitted light divergence angle. The micro-lens array 808 is able to collect most/all of the diverging light from the light sources of an array and help form an emitted beam of light having a smaller divergence angle.

Collecting most/all of the light from the light source array and forming a beam of lower divergence angle essentially forms a higher optical bower beam (that is, optical intensity per unit of surface area is increased) resulting in a stronger received signal at the sensor for the region of interest that is illuminated by the beam. According to one calculation, if the divergence angle from the light source array is 60°, reducing the emitted beam's divergence angle to 30° will increase the signal strength at the sensor by a factor of 4.6. Reducing the emitted beam's divergence angle to 20° will increase the signal strength at the sensor by a factor of 10.7.

The optical element 807 may additionally be designed to provide further diffusion of the collected light by, e.g., constructing the element 807 with materials that are translucent in the IR spectrum and/or otherwise designing the optical path within the element 807 to impose scattering internal reflections (such as constructing the element 807 as a multi-layered structure). As mentioned briefly above, the emission surface of the optical element 807 may include distinctive lens structures 805 each shaped to direct light to its correct field of view partition. As observed in the specific embodiment of FIGS. 8a and 8b, each lens structure 805 has a rounded convex shape. Other embodiments may have, e.g., sharper edged trapezoidal shapes or no structure at all.

The optical element 807 may also be movable, e.g., by mechanically coupling, e.g., two or three voice-coil motor actuator and return spring pairs consistent with the discussions provided above with respect to FIGS. 5, 6 and 7. By designing the optical element 807 to be movable, scanning a single beam within a partition as discussed above with respect to FIG. 2d can be achieved by moving the optical element 807 in a scanning motion while illuminating only the light source associated with the partition being scanned. Additionally, the simultaneous scanning of multiple partitions as observed in FIG. 2e can be accomplished by illuminating each of the partitions' respective light sources and moving the optical element 807 in a scanning motion.

FIG. 9 shows an integrated traditional camera and time-of-flight imaging system 900. The system 900 has a connector 901 for making electrical contact, e.g., with a larger system/mother board, such as the system/mother board of a laptop computer, tablet computer or smartphone. Depending on layout and implementation, the connector 901 may connect to a flex cable that, e.g., makes actual connection to the system/mother board, or, the connector 901 may make contact to the system/mother board directly.

The connector 901 is affixed to a planar board 902 that may be implemented as a multi-layered structure of alternating conductive and insulating layers where the conductive layers are patterned to form electronic traces that support the internal electrical connections of the system 900. Through the connector 901 commands are received from the larger host system such as configuration commands that write/read configuration information to/from configuration registers within the camera system 900. Additionally, the commands may be any commands associated with a smart illumination technology system such as any of the outputs provided by the smart technology methods 301 discussed above with respect to FIG. 3

An RGBZ image sensor 903 is mounted to the planar board 902 beneath a receiving lens 904. The RGBZ image sensor 903 includes a pixel array having an RGBZ unit pixel cell. The RGB pixel cells are used to support traditional "2D" visible image capture (traditional picture taking) functions. The Z pixel cells are sensitive to IR light and are used to support 3D depth profile imaging using time-of-flight techniques. Although a basic embodiment includes RGB pixels for the visible image capture, other embodiments may use different colored pixel schemes (e.g., Cyan, Magenta and Yellow).

The image sensor 903 may also include ADC circuitry for digitizing the signals from the image sensor and timing and control circuitry for generating clocking and control signals for the pixel array and the ADC circuitry.

The planar board 902 may include signal traces to carry digital information provided by the ADC circuitry to the connector 901 for processing by a higher end component of the host computing system, such as an image signal processing pipeline (e.g., that is integrated on an applications processor).

A camera lens module 904 is integrated above the RGBZ image sensor 903. The camera lens module 904 contains a system of one or more lenses to focus received light to the image sensor 903. As the camera lens module's reception of visible light may interfere with the reception of IR light by the image sensor's time-of-flight pixel cells, and, contrawise, as the camera module's reception of IR light may interfere with the reception of visible light by the image sensor's RGB pixel cells, either or both of the image sensor's pixel array and lens module 903 may contain a system of filters arranged to substantially block IR light that is to be received by RGB pixel cells, and, substantially block visible light that is to be received by time-of-flight pixel cells.

An illuminator 905 capable of illuminating specific regions within the field of view consistent with the smart illumination technology as explained in the above discussions is mounted on the planar board 902. The illuminator 905 may be implemented, for example, as any of the illuminators discussed above with respect to FIGS. 5 through 8a,b. A light source driver is coupled to the illuminator's light source 907 to cause it to emit light with a particular intensity and modulated waveform.

In an embodiment, the integrated system 900 of FIG. 9 supports three modes of operation: 1) 2D mode; 3) 3D mode; and, 3) 2D/3D mode. In the case of 2D mode, the system behaves as a traditional camera. As such, illuminator 905 is disabled and the image sensor is used to receive visible images through its RGB pixel cells. In the case of 3D mode, the system is capturing time-of-flight depth information of an object in the field of view of the illuminator 905. As such, the illuminator 905 is enabled and emitting IR light (e.g., in an on-off-on-off . . . sequence) onto the object. The IR light is reflected from the object, received through the camera lens module 1504 and sensed by the image sensor's Z pixels. In the case of 2D/3D mode, both the 2D and 3D modes described above are concurrently active.

FIG. 10 shows a depiction of an exemplary computing system 1000 such as a personal computing system (e.g., desktop or laptop) or a mobile or handheld computing system such as a tablet device or smartphone. As observed in FIG. 10, the basic computing system may include a central processing unit 1001 (which may include, e.g., a plurality of general purpose processing cores) and a main memory controller 1017 disposed on an applications processor or multi-core processor 1050, system memory 1002, a display 1003 (e.g., touchscreen, flat-panel), a local wired point-to-point link (e.g., USB) interface 1004, various network I/O functions 1005 (such as an Ethernet interface and/or cellular modem subsystem), a wireless local area network (e.g., WiFi) interface 1006, a wireless point-to-point link (e.g., Bluetooth) interface 1007 and a Global Positioning System interface 1008, various sensors 1009_1 through 1009_N, one or more cameras 1010, a battery 1011, a power management control unit 1012, a speaker and microphone 1013 and an audio coder/decoder 1014.

An applications processor or multi-core processor 1050 may include one or more general purpose processing cores 1015 within its CPU 1001, one or more graphical processing units 1016, a main memory controller 1017, an I/O control function 1018 and one or more image signal processor pipelines 1019. The general purpose processing cores 1015 typically execute the operating system and application software of the computing system. The graphics processing units 1016 typically execute graphics intensive functions to, e.g., generate graphics information that is presented on the display 1003. The memory control function 1017 interfaces with the system memory 1002. The image signal processing pipelines 1019 receive image information from the camera and process the raw image information for downstream uses. The power management control unit 1012 generally controls the power consumption of the system 1000.

Each of the touchscreen display 1003, the communication interfaces 1004-1007, the GPS interface 1008, the sensors 1009, the camera 1010, and the speaker/microphone codec 1013, 1014 all can be viewed as various forms of I/O (input and/or output) relative to the overall computing system including, where appropriate, an integrated peripheral device as well (e.g., the one or more cameras 1010). Depending on implementation, various ones of these I/O components may be integrated on the applications processor/multi-core processor 1050 or may be located off the die or outside the package of the applications processor/multi-core processor 1050.

In an embodiment one or more cameras 1010 includes an illuminator capable of illuminating specific regions within the camera field of view consistent with the smart illumination technology as explained in the above discussions. Application software, operating system software, device driver software and/or firmware executing on a general purpose CPU core (or other functional block having an instruction execution pipeline to execute program code) of an applications processor or other processor may direct smart illumination commands, or other commands, to and receive image data from the camera system. Other commands that may be received by the camera 1010 include commands for entrance into or exit from any of the 2D, 3D or 2D/3D camera system states discussed above.

The smart illumination technology itself may be implemented, partially or wholly, as any one or more of the following: 1) software that runs on a general purpose processing core; 2) system firmware (e.g., BIOS firmware); 3) dedicated logic circuitry (e.g., disposed at one or more of the following: on the camera 1010, integrated in an ISP 1019; integrated with an I/O or peripheral controller 1018). As discussed above the smart illumination technology may receive input information from the power management control unit which itself may be implemented, partially or wholly, with any one or more of software that runs on a general purpose processing core, system firmware, dedicated logic circuitry, etc.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
scanning light within a time-of-flight camera's field of view to illuminate a region within said field of view, wherein said scanning of said light further comprises changing horizontal and vertical locations within said region that are illuminated by said light, wherein said field of view is partitioned into different partitions and said scanning of said light is performed by illuminating and scanning multiple partitions simultaneously, each partition receiving its own respective beam of light; and,
determining depth profile information within said region using time-of-flight measurement techniques.

2. The method of claim 1 wherein said scanning is disjointed.

3. The method of claim 1 wherein said light changes size during said scanning.

4. A non-transitory machine readable storage medium containing program code stored thereon that when processed by a digital processing system causes a time-of-flight camera system to performed the following method:
scanning light within a time-of-flight camera's field of view to illuminate a region within said field of view, wherein said scanning of said light further comprises changing horizontal and vertical locations within said region that are illuminated by said light, wherein said field of view is partitioned into different partitions and said scanning of said light is performed by illuminating and scanning multiple partitions simultaneously, each partition receiving its own respective beam of light; and,
determining depth profile information within said region using time-of-flight measurement techniques.

5. The machine readable storage medium of claim 4 wherein said scanning is disjointed.

6. The machine readable storage medium of claim 4 wherein said light changes size during said scanning.

7. The machine readable storage medium of claim 4 wherein said method further comprises sending commands describing said scanning to an illuminator of said time-of-flight camera system.

8. An apparatus, comprising:
a time-of-flight camera system comprising:
an illuminator, said illuminator comprising a movable optical component to scan light within a region of said time-of-flight camera's field of view, the movable optical component to change horizontal and vertical locations within said region that are illuminated by said light, the movable optical component comprising any of a lens, a light source and a mirror, wherein said field of view is partitioned into different partitions and said scanning of said light is performed by illuminating and scanning multiple partitions simultaneously, each partition receiving its own respective beam of light; and,
an image sensor to provide information to determine depth profile information within said first region using time-of-flight measurement techniques.

9. The apparatus of claim 8 wherein said scanning is able to be disjointed.

10. The apparatus of claim 8 wherein said movable optical component is a lens.

11. The apparatus of claim 8 wherein said movable optical component is a light source.

12. The apparatus of claim 8 wherein said movable optical component is a mirror.

13. The apparatus of claim 8 wherein the apparatus is integrated within a computing system.

14. An apparatus, comprising:
a time-of-flight camera system comprising:
an illuminator, said illuminator comprising a movable optical component to scan light within a region of said time-of-flight camera's field of view, the movable optical component to change horizontal and vertical locations within said region that are illuminated by said light, the movable optical component comprising any of a lens, a light source and a mirror, wherein said light is able to change size during said scanning; and,
an image sensor to provide information to determine depth profile information within said first region using time-of-flight measurement techniques wherein said light is able to change size during said scanning.

* * * * *